United States Patent
Mandzsu et al.

(10) Patent No.: US 10,703,039 B2
(45) Date of Patent: Jul. 7, 2020

(54) ANTISLIP, HEAT SEALABLE PLASTIC FLEXIBLE PACKAGING BAG AND METHOD AND APPARATUS FOR ITS PRODUCTION

(71) Applicant: FLEXINNOVA KFT, Fot (HU)

(72) Inventors: Jozsef Mandzsu, Budapest (HU); Zoltan Mandzsu, Budapest (HU); Jozsef Mandzsu, Fot (HU)

(73) Assignee: FLEXINNOVA KFT, Fot (HU)

(*) Notice: Subject to any disclaimer, the term of this patent is extended or adjusted under 35 U.S.C. 154(b) by 31 days.

(21) Appl. No.: 16/304,403

(22) PCT Filed: Apr. 20, 2017

(86) PCT No.: PCT/HU2017/000028
§ 371 (c)(1),
(2) Date: Nov. 26, 2018

(87) PCT Pub. No.: WO2017/203305
PCT Pub. Date: Nov. 30, 2017

(65) Prior Publication Data
US 2019/0291337 A1   Sep. 26, 2019

(30) Foreign Application Priority Data
May 26, 2016   (HU) ...................................... 1600340

(51) Int. Cl.
*B29C 59/02* (2006.01)
*B29C 48/88* (2019.01)
(Continued)

(52) U.S. Cl.
CPC ........ *B29C 59/021* (2013.01); *B29C 48/0018* (2019.02); *B29C 48/913* (2019.02);
(Continued)

(58) Field of Classification Search
CPC . B29C 59/021; B29C 48/913; B29C 48/0018; B65D 33/005; B29K 2023/065; B29K 2023/12; B29L 2031/7129
See application file for complete search history.

(56) References Cited

U.S. PATENT DOCUMENTS

| 3,283,992 A | 11/1966 | Hanson et al. |
| 4,407,879 A | 10/1983 | Smart |
(Continued)

FOREIGN PATENT DOCUMENTS

| DE | 3437414 A1 | 4/1986 |
| DE | 19938828 A1 | 3/2001 |
(Continued)

OTHER PUBLICATIONS

Authorized Officer: Fageot, Philippe, International Preliminary Report on Patentability issued in PCT application No. PCT/HU2017/000028, dated May 15, 2018, 15 pp.
(Continued)

*Primary Examiner* — Michael C Miggins
(74) *Attorney, Agent, or Firm* — Kaplan Breyer Schwarz, LLP

(57) ABSTRACT

An antislip, heat sealable plastic packaging bag, is formed from an antislip flexible packaging material whose wall has an average surface weight of at most 500 g/m². The packaging material includes a multiplicity of randomly distributed, separate antislip protrusions of a first substance. The protrusion height is between 50 micrometres and 10000 micrometres, with an average of top-plan-view aspect ratios of the antislip protrusions being at most 5.0. Some antislip protrusions have a hidden surface portion being a portion of a free surface of the antislip protrusion, which the antislip protrusion covers from a viewer in a top plan view of the wall. The first substance is a thermoplastic polymer, and the wall's outer surface is of a substance at least somewhat different from the first substance. It is an important feature that the first substance has a melt mass flow rate of at least 0.6 g/10 min. An apparatus, for producing the packaging material, includes a film blowing die head, a cooling air ring, and a particle dispersing unit therebetween, for dispersing polymer particles on the bubble neck at a place in, or closely under, an expanding area where the bubble has a divergent shape.

29 Claims, 7 Drawing Sheets

(51) Int. Cl.
*B29C 48/00* (2019.01)
*B65D 33/00* (2006.01)
*B29K 23/00* (2006.01)
*B29L 31/00* (2006.01)

(52) U.S. Cl.
CPC ............ B29C 59/02 (2013.01); B65D 33/005 (2013.01); *B29C 2059/028* (2013.01); *B29K 2023/065* (2013.01); *B29K 2023/12* (2013.01); *B29L 2031/7129* (2013.01)

(56) References Cited

U.S. PATENT DOCUMENTS

| | | |
|---|---|---|
| 4,488,918 A | 12/1984 | Jofs |
| 6,132,780 A | 10/2000 | Archibald et al. |
| 6,444,080 B1 | 9/2002 | Mandzsu et al. |
| 7,314,662 B2 | 1/2008 | Lefebvre et al. |
| 2015/0036952 A1 | 2/2015 | Pang |

FOREIGN PATENT DOCUMENTS

| | | |
|---|---|---|
| HU | 220997 B1 | 7/2002 |
| HU | 222597 B1 | 8/2003 |
| HU | 0202948 A2 | 5/2004 |
| WO | 89/01446 A1 | 2/1989 |
| WO | 98/34775 A2 | 8/1998 |
| WO | 99/36263 A1 | 7/1999 |

OTHER PUBLICATIONS

Allan L. Griff, "Melt Index Mysteries Unmasked", "Film Lines", Canadian Plastics Industry Association, Winter 2003, 1 pp.

ANTISLIP, HEAT SEALABLE PLASTIC FLEXIBLE PACKAGING BAG AND METHOD AND APPARATUS FOR ITS PRODUCTION

FIELD

The invention relates to antislip, plastic flexible packaging bags heat sealable e.g. for closing the package, including for example prefabricated individual bags and bags formed in a Form-Fill-Seal (i.e., FFS) packaging process, the bags based e.g., on plastic films, plastic woven and/or nonwoven fabrics, or flexible plastic composites etc. Further the invention relates to methods and apparatuses for their manufacturing.

BACKGROUND

Earlier paper packaging bags have been replaced with plastic bags in many fields of heavy duty flexible packaging application (e.g., packing of fertilisers, polymer pellets, animal feed etc). One of the advantages of plastic is that plastic (e.g. film or woven fabric) bags can be closed with welding after filling. That is one of the factors that have lead to their use in modern automated Form-Fill-Seal (i.e., FFS) packaging. A drawback of plastic bags, however, is that they are more slippery than traditional kraft paper bags which causes problems at their stacking involving laying the bags (especially if filled with such easily-flowable materials as e.g. dry salt or dry classified quartz sand) onto each other on a pallet. There have been several approaches for making plastic bags antislip.

Plastic bag outer surfaces can be tackified or provided with spots or strips of a coating, or print, of such a polymer or ink as has a substance of a high coefficient of friction, e.g. with spots or strips of such hot melt or water-based glue coating. It can decrease the slip between the bags. The substance must be tacky and/or elastomeric to provide an antislip effect. In such products the high-coefficient-of-friction coating is essentially two-dimensional and as flat and thin as possible, because making it to be thicker would not improve its antislip character but would increase it costs. In our understanding it means that in these cases even if the surface is provided with a certain roughness or texture on the micro-scale, it is the substance (e.g. a hot melt polymer) of the textured surface that provides an antislip effect, rather than the geometry of the texture, and a height of the coat texture is typically much lower than about 50 micrometres, most often it is up to about 10 micrometres. One example is in DE19938828A1.

Such antislip effect can be spoiled under dusty or wet circumstances and also the generally soft antislip substance is usually not abrasion-resistant enough.

In US20150036952A1 as anti-skid material, heated, liquefied Vistamaxx™ 6202 (an easily extrudable olefinic elastomer grade from ExxonMobil Chemical) is applied from an extrusion head to a woven polypropylene packaging bag, and immediately flattened with rollers, in plural spaced apart strips with the aim of increasing the coefficient of friction of the surface. We think that here also, a high coefficient of friction of the elastomer necessarily comes together with a low wear- or abrasion resistance of the same. A final layer thickness of the strips is not stated in the text, and the figures are not to scale. In our understanding, however, if the layer thickness of the strips were great enough to provide an antislip effect based on a mechanical interlock between mating strips of mating bags (independently from the substance of the strips being elastomeric) then the long continuous strips would severely compromise the bag's flexibility, and in addition the antislip effect based on the mechanical interlock would lack any isotropy, further it would be very expensive.

Roughened plastic flexible packaging materials are known to have been used in individual-bag as well as FFS packaging also in industries packing dusty products. In such materials the antislip effect is based on an essentially three-dimensional texture of the rough surface while simultaneously a flexibility of the packaging material should be maintained. Namely, protruding parts of the antislip surface interlock with a mating surface. Necessarily, typically the higher and sharper the protrusions are, the better the antislip interlock is. Typically a protrusion height of at least about 50 micrometres is useful, and a presence of an undercut in the protrusions (as seen in a side view of the protrusion) makes the antislip effect much better.

In a first group of roughened antislip plastic flexible packaging material solutions the roughening texture is formed from the material of the plastic wall of the packaging material itself. In DE 3437414 A1 embossing pins are used to raise individual points of the film, in U.S. Pat. No. 3,283,992 linear ribs are raised from the original surface, in U.S. Pat. No. 6,132,780 an annular ring surrounds a perforated aperture in the film. Drawbacks thereof include that a desirable sharp, undercut character of the roughening protrusions can not be provided, further, the substance of the antislip protrusions is inherently identical with that of the wall, and the wall can be weakened. Further, with antislip protrusions of rib-like, elongated shape (as seen in a top view thereof) generally a desirable isotropy (i.e., providing uniform antislip engagement in all shearing directions) of the antislip surfaces can not be provided and also a flexibility of the packaging material is compromised.

In a second group of roughened antislip plastic flexible packaging material solutions the roughening texture is formed from a material other than the material of the plastic wall or of the essential strength-giving layer or -component of the packaging material. In U.S. Pat. No. 4,407,879 there is blown a film from a polyethylene blend whose two components are compatible (i.e., in our understanding, have identical melt mass flow rates) to be extruded together well, and have dissimilar (higher and lower) softening temperature points, and the film is reheated to between the two softening temperature points in order to re-melt the blend-component of the lower softening temperature point and thereby roughen the film's surface. The document focuses on the teaching that a polymer is easier and faster to melt if it has a lower softening or melting temperature. The document does not mention any melt mass flow rate values of the polymers but implicitly suggests a use of polymers of a great melt strength (i.e., a very low fractional melt mass flow rate) in order of keeping the partially re-melted film from breaking. The drawbacks of the method are its complexity and that the film's strength appears to be difficult to maintain with regard to the heat treatment. In U.S. Pat. No. 4,488,918, making a coextruded blown packaging film with a roughened antislip outer surface includes using in an outer coextrusion layer a high density polyethylene grade having an expressly low fractional melt mass flow rate preferably as low as 0.14 or preferably even lower, which is taught to be fundamental to its roughening effect. (Fractional melt mass flow rate is a name used for melt mass flow rate values lower than 1.0). The method is complicated, provides imperfect isotropy of the antislip effect, and for an acceptable antislip effect a thick ruptured coextrusion layer is necessary which compromises a flexibility of the material and is costly. Anotherway of making packaging films with a roughened antislip outer surface is mixing, in the extruder, relatively solid particles into the film's melted substance which finally results in solid protrusions in the outer surface of the film. The particles must survive the extrusion therefore their substance is either non-thermoplastic, such as mineral (being possibly harmful to the extruder and to the film's recyclability) or such thermoplastic as has an extremely high melt viscosity, i.e., an extremely low melt mass flow rate (see e.g. U.S. Pat. No. 7,314,662). Another method, described in WO 8901446A1, of roughening a polyethylene plastic bag wall includes printing a hot melt adhesive, forming "dots", or more exactly, truncated cones and hemisphere-like protrusions on the film. Its apparatus is a gravure printing roll with cups of 120 micrometres depth and 1 mm diameter. The printed "dots" must implicitly have a diameter of 1 mm, corresponding to the diameter of the cups of the gravure roll, and their height is described to be 50-150 micrometres, thus they are definitely low-profile, flat protrusions (meaning that the document's figures must not be in scale). Hot melt printing, in general, inherently needs melt polymers of a very low melt-viscosity, i.e., of a very high melt mass flow rate in order of allowing a handling of the melt in the apparatus (i.e., filling and emptying the gravure cups, pumping and filtering the melt etc.). (We note that a material having a low melt-viscosity, or high melt mass flow rate, does not necessarily have a low melting temperature, because the two parameters are essentially independent from each other.) Just because of the extremely low viscosity of the liquid melt, hot melt printing processes are inherently unsuitable for forming any high, or sharply protruding, undercut protrusions.

There is a third group of roughened antislip plastic flexible packaging material solutions. These are based on the concept of dispersing and fixing thermoplastic roughening particles, of a size suitable for the slip-decreasing purpose, on the surface of a plastic film or fabric. (Any such use of non-thermoplastic particles would be undesired due to a spoiling of a recyclability of the product). Namely, PCT publication WO 98/34775 and corresponding U.S. Pat. No. 6,444,080 (originating from the current inventors) describe an antislip packaging film comprising a polyethylene film wall and antislip protrusions projecting from its surface, the protrusions constituted by thermoplastic polymer particles fixed to the wall's surface. According to their teaching, the material of the particles can be the same as that of the film wall (note: e.g. polyethylene and polyethylene) or it can also be another plastic material capable of welding with the film wall (note: e.g. polyethylene and polypropylene). Further, the particles can also be adhered to the surface. It means that the substance of the particles can be selected independently from the substance of the film wall. According to the teaching of the documents, the particles must have a good abrasion resistance and also a suitable size (preferably a narrow size fraction). Hungarian publication HU200202948A2 (originating from the current inventors) describes similar roughened packaging films and teaches to use reactor powder as the particles. Granted Hungarian patent HU222597B1, corresponding to WO99/36263 (originating from the current inventors), mentions a polypropylene fabric with an antislip plastic layer comprising protrusions welded into and sticking out of the surface, consisting of the substance of the antislip layer and/or other particles capable of welding with the material of the antislip layer, wherein the antislip layer is fixed to the polypropylene fabric by coating in a moulded condition. In a process example of U.S. Pat. No. 6,444,080 in a film blowing apparatus a polyethylene tubular film is drawn up to form a balloon. For a roughening, polyethylene particles are brought to the film surface before a blowing of the cooling air onto the film. Patent HU220997B1 (originating from the current inventors) describes, in detail, an apparatus for such roughening of a film during the manufacturing of the film wall. In HU220997B1, Page 4, Column 1, lines 26-36 cite (see its FIG. 2.): "Since we displaced, by lifting it up, the cooling ring 20 from a plane of the die gap 2, the film tube 23 remains of essentially the same diameter from having left the die gap 2 up to the cooling ring 20. This section is usually called a neck of the bubble. A height of the mentioned neck can be modified through the haul-off speed and/or a selection of a place of the cooling and/or an intensity of the cooling. The film tube 23 is fully plastic-state in its section between the cooling ring 20 and the die gap 2, i.e., in its neck. This is the section where we get the polymer particles 24 onto the plastic-state film tube 23.". Further its Page 4, Column 2, lines 27-33 cite (see its FIG. 2.): "An extent of a melting of the polymer particles 24, and thus also of their welding into the surface of the plastic-state tube 23, can be influenced with displacing the cooling ring 20 in a direction of the moving of the film tube 23. Thus, as a certain period of time free of cooling is provided for the polymer particle 24, it welds into the surface of the film tube 23, and thereby a desired roughening can be achieved." Its FIG. 2., in accordance with its description, shows the melted neck of a plastic bubble emerging from a film-blowing die, and shows the particles being blown, at a first altitude above the die, onto a section of the neck where the neck essentially has a cylindrical shape, and shows a cooling ring at a second altitude significantly high above the place of the blowing of the particles. Particles bouncing from the bubble fall into a suction unit (signed 34 in FIG. 2. of HU220997B1) and are vacuumed away, collected and re-used for the same purpose. From the patent the skilled person will understand that providing a long cylindrical stalk or neck of the bubble is necessary, namely for providing for the dispersed particles a period of time free of cooling.

Further, the ISO 1133-1 standard describes the standard method of determination of the melt mass-flow rate (MFR) of thermoplastics using an extrusion plastometer. The ISO 1133-1 standard prescribes that if melt flow properties in regard of a plastic film are to be measured then some small pieces of the film must be cut, by default, into strips and compacted before measuring.

Our considerations about the above-mentioned second and third groups of known solutions are as follows. Packaging films taught in the third solution group can have the advantages over those of the second solution group that the (mono- or coextruded) layer(s) of the film base wall can be substantially continuous, uninterrupted and having a substantially uniform layer-thickness and, therefore, a good load bearing even adjacently the protrusions fixed thereupon. Further, the protrusions can, in their top view, have a granule-like (rather than e.g. fibre-like or rib-like or ridge-and-valley-like) shape, and they can sharply stick out of the surface of the film base wall, preferably even having undercuts. Solid roughening protrusions taught in the third group of solutions can be realized with good abrasion resistance with a higher ratio of protrusion height to protrusion width than in other solutions (e.g. from the second solution group). All that provides an excellent antislip effect, in fact better than in the second-group solutions. Further, in the third group of solutions the size of the protrusions and also their closeness in the surface can be selected relatively freely.

Further, within the field of roughened flexible packaging materials the fact that the antislip protrusions can be of a substance selected relatively freely, and independently from that of the film wall, is a unique feature of the third group of solutions, therefore at selecting substance parameters of the antislip protrusions/roughening particles the skilled person would primarily lean on the teachings of the third-solution-group documents. Nevertheless, any suggestions available from the second group of solutions would appear to suggest using in the outmost, roughening layer of the film a substance of a very low fractional melt mass flow rate.

We note that at comparing viscosities of polymer-melts based on their melt mass flow rate values it is important to keep in mind that the values should be compared with a logarithmic approach. Namely, if we measure and compare, in accordance with the ISO 1133-1 standard, how many grams, of the given melts, flow through the test orifice within ten minutes we will see, for example that a polymer of a mass melt flow rate of 0.20 will produce a flow mass twice as great as a polymer of a mass melt flow rate of 0.10, despite the fact that there is only an absolute numerical difference of 0.10 between the two mass melt flow rate values. It means that at comparing polymers, it is essentially a ratio, of their melt mass flow rate values, rather than a difference thereof, that counts. In other words, there is a greater difference, in this respect, between melt behaviours of two polymers of respective melt mass flow rate values of 0.20 and 0.10 than between those of 200 and 150. As concerning selecting a melt mass flow rate value of the antislip protrusions/roughening particles, there is not any explicit teaching available from the background documents mentioned in the third solution group. A melt mass flow rate of the film wall material is not mentioned in the documents of the third solution group, but the inevitable, elevated cooling ring arrangement and also the shape of the bubble of FIG. 2. of HU220997B1 suggest to the skilled person a film wall material necessarily of a very low fractional melt mass flow rate. We were able to reproduce the film blowing configuration of HU220997B1, with the bubble shape described and illustrated in it, with a polyethylene film of a melt mass flow rate of 0.2 g/10 min. determined at 190° C. under a load of 2.16 kg in accordance with ISO 1133-1. The demand for a good abrasion resistance of the particles (taught in U.S. Pat. No. 6,444,080) leads the skilled person toward a particle-substance of a low fractional melt mass flow rate since a very low melt mass flow rate is known to mean greater product abrasion-resistance and strength (about this see the last paragraph of "Melt Index Mysteries Unmasked (as published in Film Lines (Canadian Plastics Industry Association, Winter 2003))" at internet link "http://www.griffex.com/Griff-meltindex.pdf"). Certain documents in the third solution group teach and suggest the use of reactor powder. That factor, again, leads the skilled person towards very low fractional-melt-flow-rate powders rather than towards higher-melt-flow-rate powders, just like the following factor does: in HU220997B1 the particles bouncing from the hot bubble are re-collected by vacuum and re-used again for the same purpose, such re-used particles making up a very considerable portion of the total amount of powder (see HU220997B1 FIG. 2 sign 24, low left side corner). According to our practical experience the bouncing particles are inevitably hot and therefore prone to sticking together during their re-collection unless they have an expressly low fractional melt mass flow rate, as would also be clear to a skilled person based on trial and error. We managed to perform the operation of the configuration taught in HU220997B1 FIG. 2 with a high density polyethylene reactor powder of a melt mass flow rate of 0.25 g/10 min. determined at 190° C. under a load of 2.16 kg in accordance with ISO 1133-1. Summing it up, there is not any teaching or suggestion prompting (explicitly or implicitly) the skilled person to use in a roughened packaging film, belonging to the third solution group, thermoplastic antislip protrusions of a substance of a melt mass flow rate as high as, or higher than, 0.6 g/10 min while there are definite suggestions on the contrary.

There is still a need to expressly select a melt mass flow rate in the substance of the antislip protrusions used in the solutions of the third solution group.

Further, it is a part of our recognition that we found new problems to solve. These problems, to be solved, relate to antislip packaging bags and to methods and apparatuses for providing plastic packaging bags, as follows.

SUMMARY

In regard of antislip packaging bags we found the following. Plastic flexible packaging materials can be heat sealed for closing the package, for example a bag of plastic film or plastic woven or nonwoven fabric is filled with contents and then a mouth of the bag is closed with welding, either manually or mechanised for example in a Form-Fill-Seal (FFS) machine. The operator selects such welding temperature and welding time and cooling time as is experienced to be the best for the given product. In some cases even the welding pressure can be freely selected by the operator. That selection is, even with modern FFS machines, essentially empirical, based on trial and error. Welding machine operators prefer if all the different packaging materials (for different product variants packed) running through their welding machine accept the same operating point of welding. For example, a packer bags 25 kg's of quartz sand into 110 micrometre-thick ordinary polyethylene film for one customer and the next day he bags the same quartz sand, for another customer, into the same film but with antislip protrusions on the film. Plastic (e.g. polyolefin) packaging films accept a relatively wider range of welding parameters, while plastic (e.g. polyolefin) woven fabrics are more sensitive to a proper selection of the welding parameters, because, as we theorise, the tapes from which the fabric is woven have a great molecular orientation which makes the welded tape portions prone to receding from under the welding tool by their heat shrinking. Both with films and fabrics, if the used welding operating point differs too much from the optimum, then it can weaken certain parts, or the whole, of the sealed seam which introduces a latent risk of later customer complaints. This fault is hard to detect during the manufacturing of the packages. In case of packaging materials taught in documents of the third solution group, roughened surface parts can be in the heat-sealed, or welded, zones. For a first look it causes no problems because the antislip protrusions are of thermoplastic materials, and preferably even weldable with the wall of the packaging material. We, however, gained an insight into what happens during such a heat sealing. At the very beginning of the heat sealing or welding, the antislip protrusions act as spacers between the welding tool and the wall of the packaging material. Further, for example in case of a roughened side-gusset being welded, or in case of an overlapped-style FFS packaging or a pinched-top-closing, they can even act as spacers between facing plastic walls to be welded together. The antislip protrusions must first be melted, and compressed flat, before the actual welding of the walls together. The need for the melting and compressing of the antislip protrusions increases the welding energy required for the complete welding. In other words, the local presence of antislip protrusions in the heat sealed or welded zone in fact modifies, to a certain extent, the welding operating point ideal for the weld. It is, in theory, possible to exactly select, on the welding machine, the welding parameters especially required for the welding of the roughened surfaces, but operators do not like to change, but they prefer to run antislip bags with the same settings as they use for ordinary bags. More over, in a single antislip bag, there can simultaneously be roughened and non-roughened surface parts in the heat sealed or welded zone, for example if the roughening is formed in spots or strips. We add that, at manual welding as well as with FFS welding machines, a perfectly exact positioning and orienting of the welded line within the packaging material can never be guaranteed. All that can result in certain bags or certain bag parts being heat sealed or welded with a suboptimal welding operating point. As we recognised, there is a need to form such thermoplastic, particle-like antislip protrusions of the packaging material, e.g. with fixing particles to a flexible packaging material wall, whose presence does not influence too much the optimum welding parameters of the flexible packaging material. There is a need for such new packaging materials/ bags, and for methods and apparatuses for their manufacture.

We examined and found that there are two product factors whose presence, in combination, makes dealing with a solution to this problem (of the welding operating point requirement being modified by a presence of antislip surface protrusions) particularly significant. First, if the antislip protrusions can be of a material selected to be different from a material of the packaging film or fabric wall itself, then it gives a possibility of making this selection in a beneficial way. Second, if the wall of the packaging material is relatively thin (i.e., lightweight) compared to a height of its antislip protrusions then it makes this configuration relatively sensitive in regard of our problem, because the extra welding energy requirement (needed for heating and flattening the spacer protrusions) is relatively greater, in proportion of the basic welding energy requirement (needed for welding the walls together). This second factor we formalise as a combination of the packaging material wall having a surface weight of at most 500 g/m$^2$ and the antislip protrusions having a height of at least 50 micrometres. However, we also found further factors whose presence can even further increase a significance of the question, namely if the antislip protrusions have relatively great individual volumes, particularly greater than 0.0000335 mm$^3$, and if the antislip protrusions are of an undercut character, which is very important in our opinion (in the latter case the height/width ratio of the protrusion can be relatively great and also a narrower, undercut foot of the protrusion can decrease heat conducted therethrough). We also found a further special circumstance, namely the welding operating point is particularly sensitive to a presence of antislip protrusions of the discussed kind if the packaging material includes a plastic woven fabric. As we said earlier, fabrics are more sensitive to selecting a welding operating point close enough to the optimum. Further, as we theorise, in the very first phase of the welding, when the protrusions are yet in place, acting as spacers, a radiant heat of the hot surface can already cause an undesired shrinking of the woven fabric wall before its actual full-surface compressing and welding takes place. As we said, fabric tapes have a greater individual molecular orientation than a blown film (and that is what makes a fabric stronger than a film of equivalent surface weight). We also found a further circumstance, namely the welding operating point is particularly sensitive to a presence of antislip protrusions if the bag is to carry contents of a mass of more than 4.5 kg (i.e., if it is a heavy duty bag). Understandably, a heavier load makes it more critical to make perfect heat seals in the bag. Also, importantly enough, such package size is typical to be stacked with laying filled bags onto each other, with their mouths looking to the side rather than upwards which on the one hand provides a greater load on the mouth seal and on the other hand better exploits an antislip character of the opposing major surfaces of the bag.

We examined and found that in order to decrease an influence of the antislip protrusions on the optimum welding parameters of the flexible packaging material it is beneficial to select a particular combination of two factors already known from the background art. First, if the antislip protrusions are randomly distributed (on the micro-scale) in the roughened surface then a quality of a weld in a welding line will not be as dependent on a particular selection of a place and orientation of the welding line as it is in a packaging material having antislip protrusions of an arrangement ordered, for example into rows and columns related to a machine direction of the packaging material, on the micro-scale. Namely, if in the latter case the orientation of the welding line is approximately parallel or perpendicular to the machine direction, then an outcome of the welding, in regard of how many antislip protrusions fall into the welded line zone, will be very sensitive to both the exact position and orientation of the welding line. Such sensitivity can be ruled out by providing the antislip protrusions in a real random distribution on the micro-scale. Second, if an antislip protrusion is, looked at from above its top, relatively round, rather than relatively elongated, then an actual orientation of the antislip protrusion relative to the orientation of the welding line can not influence a chance of the antislip protrusion intersecting the welded zone as much as with a packaging material having elongated (e.g. expressly rib-like or fibre-like or strand-like in a top view) antislip protrusions. Therefore with antislip protrusions whose average top-plan-view aspect ratio (ratio of greatest to smallest extent in a top plan view) is at most 5.0, the welding quality will remain relatively independent from the mentioned accidental factors. However, we also found further factors, known per se, whose selection can even further decrease an influence of the presence of the antislip protrusions on the optimum welding parameters. As it could be seen, a random character of the arrangement of the antislip protrusions is beneficial for our objective. Analogously, we think that it is beneficial if the antislip protrusions are of random sizes. Further, naturally, the less protrusions there are in the surface, the lesser influence they will have on the welding. Therefore we found it beneficial if the antislip protrusions occupy at most 60% of the surface in a top plan view.

Nevertheless, we examined and found that it is the melt mass flow rate selected in the substance of the antislip protrusions that plays the most important role in influencing the optimum welding parameters, rather than for example a melting temperature selected in the substance of the antislip protrusions. We found that the higher the melt mass flow rate of the substance of the antislip protrusions is, the less influence the presence of the antislip protrusions has on the optimum welding parameters of the packaging material. To illustrate this, see Comparative Example 1. We theorise that in its background there is the following. When, at the start of the welding, the protrusion, as a spacer, is exposed to a compression with a hot surface, its temperature starts to rise by time. As its temperature rises, it starts to lose its rigidity and starts to let the compressing hot surface deform the protrusion into a flat shape. A protrusion of a substance of a higher melt mass flow rate loses (to a desired certain extent) its rigidity at a lower temperature, i.e., at an earlier time, than one with a lower melt mass flow rate. In other words, at a given heating temperature and pressure, a higher-melt-mass-flow-rate spacer-protrusion will collapse sooner than a lower-melt-mass-flow-rate protrusion, decreasing the extra welding time required because of the presence of the protrusions. The lesser that extra welding time requirement is, the closer the optimum welding parameters of the roughened material will be to those of a non-roughened one. The presence of the antislip protrusions only has an essential effect on the optimum welding parameters if the thickness of the wall is not too great relative to the protrusions' height. Further, the more protrusions there are, per $cm^2$, in the surface, the greater significance they have in influencing the welding parameters. Further, particles or granules fixed to the surface sticking out to a greater protrusion height, or with a more emphasized undercut, will influence the welding parameters more than the same particles embedded deeper into the surface with a lower protrusion height.

In regard of methods for producing antislip packaging bags we examined the background art and recognised the following. Generally when films for packaging purposes are manufactured with film blowing, the diameter of the die gap is smaller than a final diameter of the (frozen) bubble which means there is provided a horizontal expansion in the proceeding, plastic-state wall of the bubble whose complete extent is referred to as blow-up-ratio (B.U.R.). In addition, the wall, because of its own weight, is continuously exposed to a vertical stretching, from the die gap on, as long as the wall is plastic-state enough to be stretched, i.e., up to the freezing line. The plastic-state, stretching part of the bubble is referred to as the neck of the bubble. If, in accordance with the teaching of the background art, we bring and stick plastic particles to a landing area selected in the tacky outer surface of the wall of the bubble in any such area of the neck where the neck has a shape of a vertical cylinder, i.e., where there is not any horizontal expanding of the wall taking place, i.e., where all tangent planes to the bubble are vertical, then the particles having stuck to the outer surface start to travel upwards with the wall as the wall proceeds toward the haul-off. With respect to the stretching and expanding of the wall, happening above the landing area and progressively decreasing a closeness of the stuck particles in the outer surface, in order of a possible densest final particle covering of the outer surface it is reasonable to saturate the outer surface with the particles in the landing area. It means that in the landing area neighbouring particles, freshly arrived to the outer surface, are in contact with each other. From the moment of their arrival to the outer surface their temperature is progressively raised (by the hot outer surface) and at a point they become hot enough to become tacky. Simultaneously, as the wall carrying them becomes progressively thinner, the particles get progressively more and more distant from each other at least in the vertical direction due to the continuous vertical stretching present in the wall. And as soon as a horizontal expansion of the wall takes place, i.e., as soon as tangent planes of the neck become divergent (i.e. closing essential angles with the vertical), the particles start receding from each other also in the horizontal direction. Heating up and getting more and more distant are therefore concurrent processes of the stuck neighbouring particles. With an arrangement corresponding to that taught in HU220997B1 and with particles of definitely low fractional melt mass flow rates, such as of 0.25 g/10 min. determined at 190° C. under a load of 2.16 kg in accordance with ISO 1133-1, we experienced that a purely vertical moving-apart of neighbouring particles is sufficient to prevent a sticking-together of the neighbouring particles, in other words, a purely vertical moving-apart of neighbouring particles is enough to separate the neighbouring (and originally adjacently contacting) particles before they get as tacky (from heat) as to stick together. But, as we recognised, if we select a relatively higher melt mass flow rate in the substance of the particles then it can happen that neighbouring particles, freshly stuck to the outer surface, travelling with the wall, in a cylindrical section of the neck where the wall is free from a horizontal expansion, start to stick to each other before a horizontal expansion of the wall starts. We theorize that it is the result of the particles of a higher melt mass flow rate becoming semi-liquid at a lower temperature, i.e., at an earlier time, than particles of a lower melt mass flow rate, and if the particles reach a certain level of semi-liquidity before they are sufficiently removed from each other also in the horizontal direction, they can start to stick to their neighbours being near in the horizontal direction. Their sticking together results in a product configuration in which neighbouring protrusions, originating from neighbouring landed particles, are connected with thin tentacle-like connecting parts consisting of the material of the antislip protrusions, the connecting parts typically extending in a nearly cross-machine direction of the film corresponding to a nearly horizontal direction in the bubble. That makes it difficult to make separate antislip protrusions from each individual particle, and especially difficult to form an undercut character thereof, especially if even an isotropy thereof is also desired. We recognised that the problem can be solved if we select a landing area which is not too far below an expanding area, where within the latter the neck is not cylindrical but divergent, where the wall is exposed to a horizontal expansion. It is even more preferable if we select a landing area which is at least partly in an expanding area, i.e., if we bring the particles to such outer surface parts as are progressively divergent upwards. Namely this way the particles get far enough from each other in both machine direction and cross-machine direction before they can get as hot as to stick to their neighbours.

In regard of apparatuses for roughening a blown film we examined the background art and recognised the following. To carry out the methods mentioned hereinabove in a film blowing machine making a roughened film tube, we would like to provide an apparatus specifically designed therefor. In the mentioned process the improvement over the background art is selecting a landing area which is either in an expanding area or at east not too far below an expanding area. We recognised that we can use one or both of two different improvements, in a film blowing machine, both providing contribution over the background art corresponding to the mentioned process improvement. Namely, if we modify the apparatus of the background art, known for example from HU220997B1 in a way that we provide an arrangement, of a die head and an air ring, that is suitable to define a bubble shape divergent enough also under the air ring and we provide a particle dispersing unit for bringing the particles to that place then the method objectives can be met. This measure is definitely against the teaching of the background art. Also, if in our new arrangement we retain the known feature of the air ring defining an expanding bubble area above the air ring's bottom and we provide the particle dispersing unit near enough to the air ring (closer to the air ring than in the known apparatus), then again the same method objectives can be met and this new combination is also against the teaching of the background art. Further, we recognised that if relatively high-melt-mass-flow-rate particles are used then their bouncing from the hot bubble can lead to their sticking together before or during their recollection, because they seem to be prone to sticking together more than low fractional melt-mass-flow-rate particles. Therefore it is preferable to prevent particles from bouncing and dropping from the hot film surface at all. Further, we recognised that selecting a dual-lip (in other words: double-orifice) type air ring, rather than a single-lip type one, can help to provide a divergent bubble shape under the air ring, by increasing the diameter of the bubble at the level of the air ring bottom in relation to the level of the die gap because with a dual-lip type air ring such expanding venturi-forces can be exerted directly to the bubble right above the air ring bottom as are not possible with a single-lip type one. In fact, the same can be the case with air rings possibly having more air lips (in other words: air orifices) than two. Further, we recognised that an undesired back-wind, i.e. a wind blowing downward at the air ring bottom level between the bubble and the air ring body, typically mainly introduced by installing a dual-lip type air ring, rather than a single-lip type one, can be sufficiently extinguished with installing a wind shield between the air ring and the landing area for protecting the landing area and/or the particle-dispersing unit from the back-wind of the air ring. More over, if the wind shield includes a chamber of a suitably maintained air-pressure then even stronger back-winds can be extinguished. Further, we recognised that it can be beneficial to select a landing area as close to the die gap as possible if we want to compensate the effect of the cooling coming relatively early (due to the air ring being close to the landing area), possibly prematurely stopping the fusing process of the particles and if we want to exploit the fact that we do not necessarily need to provide room for a particle recollecting device between the die gap and the landing area. Namely, closer to the die gap the wall is thicker and hotter than thereabove, the thicker and hotter wall providing a greater specific heat charge for each particle stuck thereto, possibly suitable to offset the early cooling.

The essence of a product invention is an antislip, heat sealable plastic packaging bag,
  the packaging bag formed from an antislip flexible packaging material,
  the packaging material comprising a heat sealable plastic flexible wall having an outer surface, the wall having an average surface weight of at most 500 g/m², 
  in at least a part, the roughened part, of the wall the packaging material comprising a multiplicity of separate antislip protrusions, of a first substance, randomly distributed on the outer surface and projecting from the outer surface to a protrusion height of between 50 micrometres and 10000 micrometres, with an average of top-plan-view aspect ratios of the multiplicity of the antislip protrusions being at least 1.0 and at most 5.0,
  at least some of the antislip protrusions (more preferably at least one twentieth of the antislip protrusions, more preferably at least one tenth of the antislip protrusions, more preferably at least a quarter of the antislip protrusions, more preferably at least a majority of the antislip protrusions) having a hidden surface portion being a portion of a free surface of the antislip protrusion which the antislip protrusion covers from a viewer in a top plan view of the wall taken from above the antislip protrusions,
  the multiplicity of the antislip protrusions looking toward an outside of the packaging bag,
  the first substance being a thermoplastic polymer, and the outer surface being of a second substance different in some property from the first substance, the packaging bag being new in that
  the first substance has a melt mass flow rate of at least 0.6 g/10 min. determined at 190° C. under a load of 2.16 kg in accordance with ISO 1133-1.

As used herein, a "majority" of the antislip protrusions means a number of the antislip protrusions that is greater than half of a total number of the antislip protrusions. A "quarter" of the antislip protrusions means a number of the antislip protrusions that is one fourth of a total number of the antislip protrusions. "One tenth" of the antislip protrusions means a number of the antislip protrusions that is one tenth of a total number of the antislip protrusions. "One twentieth" of the antislip protrusions means a number of the antislip protrusions that is one twentieth of a total number of the antislip protrusions. The product is a packaging bag consisting of a flexible packaging material meaning it is suitable for packaging, including its flexibility being suitable, for example suitably isotropic, for a flexible packaging. The packaging bag can be of any suitable form, e.g. pillow bag, gusseted bag, valve bag, block-bottom bag etc. The packaging bag can be formed, from the packaging material, in any suitable way, e.g. by folding, stapling, welding, sewing, hot-melt-adhering, adhering with a crosslinked adhesive, or any combination thereof. It can be a prefabricated individual bag or can originate from a Form-Fill-Seal (FFS) process. The bag can be empty, e.g. ready to be filled and closed, or can contain contents. For example, it is possible that the flexible packaging material is only formed into an actual bag when there are already contents in it, typically in an FFS process. The packaging material is antislip due to its having the antislip protrusions that act to decrease its slipping under suitable conditions. It does not necessarily mean that the packaging material cannot slip at all. The substance of the packaging material is plastic, including one or both of suitable synthetic and natural polymers, possibly including any of the usual additives, pigments, organic and/or inorganic fillers etc., and can include any one or more of films, laminates (e.g. laminate of film(s) and fabric(s)), nonwoven fabric, woven fabric, e.g., a fabric woven from film tapes (e.g., a circularly-woven or flat-woven material) with or without an internal and/or external coat made for example with extrusion coating etc. The packaging material can also contain components other than plastic, e.g., in the form of printing, labels, inserts etc. The packaging bag, as well as the wall, is heat sealable, for example for a closing of the package, which means that after it is filled with some contents, it can be suitably closed with welding or heat sealing, for example with closing a mouth of a bag with a straight cross welding line or with forming a closed pillow package from a centre folded film in a "U"- or "L"-shaped sealer which forms heat sealed seams on three edges of a pillow-like bag. The heat sealability can, for example, mean a heat sealability with a flat heat sealer that fuses abutting flat wall surface parts together without splitting the wall or it can be, for example, a sealability with a splitting-welder which welds wall parts together along narrow edges of a split line. Heat sealability can mean any one or more of a heat sealability or weldability with any of suitable means, for example, with hot-air, hot-bar, patterned-hot-bar, hot-conveyor, ultrasonic, impulse, patterned-impulse, high-frequency or any other suitable heat sealer or welder. Providing a cooling time in each sealing cycle can be a characteristic of the heat sealer. As regarding the mentioned example heat sealing devices, their heat sealed or welded area can consist of disjunct islands of welded micro-portions (corresponding, e.g., to a pattern of the patterned welding tool) which is preferable with welding fabrics woven from flat tapes in order of keeping them from shrinking from the welding and in order of providing flat tape portions left unwelded for a more secure load bearing across the welding line. The heat sealability of the packaging bag or of the wall does not necessarily mean that all sides of the packaging material or the wall are (or are equivalently) heat sealable. As regarding a meaning of the term "average surface weight" in regard of a web or wall, its meaning is its mass divided by its surface area, and for example in case of a film bag comprising 2 m²'s of film, the surface area is 2 m²'s, meaning a total of the surface areas of its individual wall panels in accordance with the usual meaning of the term in the art. The average surface weight of the wall is at most 500 g/m², which means it is either 500 g/m² or less than 500 g/m². A lowest limit of the average surface weight is implicitly determined by the usage for a packaging material and could be for example about 3 g/m². The average surface weight of the wall means its average surface weight calculated without the multiplicity of the antislip protrusions. The wall can include one layer or more layers, (e.g., of coextruded polymers, or of films and/or fabrics, etc.), a plurality of layers can be attached to each other fully or partly, e.g., in patterns, the layers can be uniform, or similar, or different from each other e.g., providing the wall with different properties (e.g., blocking moisture, blocking ultraviolet light, giving strength, blocking oxygen, absorbing moisture, providing aesthetics, providing printable or adhereable surface, etc.). A part or possibly even the whole of the wall is roughened. There is at least one roughened part in it though it can as well include more such parts, interconnected or separate, in any useful configuration, e.g., in stripes, spots etc. Some regions can be left without roughening in order of a later stamping, writing-on or labelling. The wall has an outer surface, meaning a surface thereof for looking outward from the package when the packaging is finished. There is a multiplicity of the antislip protrusions in the outer surface, looking to an outside of the packaging bag, which means their number is great enough to generate at least some antislip effect for the package later formed and stored laid on this outer surface. There are antislip protrusions separate from each other which means that between neighbouring antislip protrusions there is a separation, e.g. there is the outer surface of the wall. The antislip protrusions can be formed in any suitable way, including forming the protrusions unitarily with the wall, e.g. with moulding, forming the protrusions fixed to the wall, forming protrusions of particles fixed, e.g., fused, welded, or adhered to the wall etc. The antislip protrusions can have any suitable shape that correspond to the specification. For example they can have an irregular granule shape or any other suitable shape. The antislip protrusions project from the outer surface and the outer surface can for example provide a flat base around a projecting antislip protrusion or the outer surface can be non-planar, e.g., can provide a bump or an indentation at a foot of the antislip protrusion or the wall can have an outer surface with a texture, e.g., in case of woven (coated or uncoated) fabrics or embossed films. The antislip protrusions project from the outer surface to a protrusion height, the protrusion height meaning a height of the protrusion from its foot (i.e., its part at which it meets the outer surface) to its top (i.e., its point farthest from its foot). The antislip protrusions are randomly distributed on the outer surface which means that in a top plan view of the wall's roughened part the respective positions of the centres of feet of the individual antislip protrusions are arranged in a random manner on a micro-scale.

Independently therefrom, the wall's roughened parts can be arranged in an ordered manner, e.g. in stripes, on a macro-scale. Each antislip protrusion has its own top-plan-view aspect ratio which means a ratio of the greatest to the smallest extent (i.e., analogously to "length-to-width") of the antislip protrusion in a top plan view of the wall's roughened part taken from above the antislip protrusions. The wall's roughened part has a characteristic that the average of the top-plan-view aspect ratio values of each of the mentioned multiplicity of the protrusions that can be seen in the top plan view of the roughened part is at most 5.0, which means it is either 5.0 or less than 5.0. As used herein, the free surface of the antislip protrusion is a surface of the antislip protrusion than can be seen from somewhere, and for example if the antislip protrusion is constituted by a granule fixed to the outer surface of the wall then its foot, where it attaches to the carrier, is not a part of the outer surface of the antislip protrusion because it is not visible from anywhere. Thus the hidden surface portions of an antislip protrusion can be found with finding out what parts of the antislip protrusion's free surface are invisible, in the top plan view, because of being hidden, from the viewer, by the antislip protrusion itself. The feature of the hidden surface portion expresses that at least some of the antislip protrusions are sharply protruding, capable of engaging at least with their hidden surface portions, implicitly usually relatively close to the outer surface. It increases the antislip quality of the product and also the significance of the invention feature, as discussed in the recognition section above. The antislip protrusions contain a first substance, which is a thermoplastic polymer. It is very rare, in practice, that a thermoplastic polymer used in a packaging material is a pure homopolymer. Similarly, in case of a given antislip protrusion, the substance of the antislip protrusion can be a homogeneous polymer or it can include different polymers, e.g. a blend of polymers, which can include homopolymers and/or copolymers etc. It can, for example, include one or both of suitable synthetic and natural polymers, possibly including any of additives, pigments, organic and/or inorganic fillers etc. The outer surface of the wall is of a second substance which is not identical with the first substance. In practice it can mean for example that the second substance is also a thermoplastic polymer but of a somewhat different chemical composition and of one or more different measurable properties or parameters, e.g., they can both be polyethylenes but different in density, and/or hardness, stiffness, melt mass flow rate, additive content, filler content, pigment content etc. It is possible that next to the foot of the antislip protrusion the first substance, from the antislip protrusion, and the second substance, from the outer surface, are mixed in a thin region, that for example corresponding to a penetration of molecules of one substance in between the molecules of another substance in a weld. It is an important feature of the invention that the first substance, which is the substance of the mentioned antislip protrusions, has a melt mass flow rate of at least 0.6 g/10 min. determined at 190° C. under a load of 2.16 kg in accordance with ISO 1133-1. It is important to note that the invention packaging material can in addition have further such protrusions as are different from the antislip protrusions defined in the invention features.

The background art does not give obvious means for the skilled person to gain knowledge of the ISO 1133-1—melt mass flow rate of selected antislip protrusions of a plastic flexible packaging material of a packaging bag. The ISO 1133-1 standard prescribes that if melt flow properties in regard of a plastic film are to be measured then some small pieces of the film must be cut, by default, into strips and compacted before measuring. The testing of such strips of the antislip packaging film or fabric, as by default, will only show the melt mass flow rate of the complete roughened film or fabric (i.e., the complete antislip packaging material) but not that of the antislip protrusions.

Therefore we are giving a new antislip-protrusions-melt-mass-flow-rate test method as follows. In a first step of the test for measuring a melt mass flow rate of a selected multiplicity of antislip protrusions projecting from an outer surface of a wall of an antislip flexible packaging material, the selected multiplicity of the antislip protrusions are separated, such as cut off with a suitably sharp blade, and removed from the wall's outer surface either manually or mechanized. Each respective antislip protrusion is separated from the outer surface at its foot (i.e., its part at which it meets the outer surface), without respect to any possible bumps or indentations of the outer surface either at a foot of an antislip protrusion or elsewhere. Successively, the complete multiplicity of the particles or sections thus collected is directly used as test sample in the test in accordance with ISO 1133-1. Further, in the resulting wall already rid of antislip protrusions the average surface weight of the wall can be directly measured.

The feature of the packaging material of the packaging bag having a multiplicity of antislip protrusions whose substance is of a melt mass flow rate of at least 0.6 g/10 min. determined at 190° C. under a load of 2.16 kg in accordance with ISO 1133-1 is an extrinsic characteristic determined in the newly formulated test of the previous paragraph. The melt mass flow rate of the substance of the respective antislip protrusions is only revealed when the packaging material of the packaging bag is, in the test, exposed to interaction with specifically chosen outside conditions such as cutting off, from the wall's outer surface, a selected multiplicity of the antislip protrusions and collecting the powder or sections thus created and directly using the collected substance as test sample in the test in accordance with ISO 1133-1. Such special preparation of a packaging material for an (otherwise standard) test is not part of the background art. This special new measure is not selected arbitrarily but it is based on recognition about the special significance of a melt mass flow rate of the substance included in the antislip protrusions themselves, independently from a melt mass flow rate of a substance of the rest of the packaging material.

The advantage of the invention product is that a presence of its antislip protrusions in its wall's roughened parts only influences its optimum welding parameters to a relatively little extent. A deeper analysis thereto can be found in the recognition section above.

It is preferable if the surface weight is at most 420 g/m$^2$, more preferably at most 370, or 320, 270, 220, 200, 180, 160, 140, 130, or even 120 g/m$^2$. Such selection increases the significance of the invention feature, as discussed in the recognition section above. It is preferable if the protrusion height is at least 60 micrometres, more preferably at least 70, or 80, 90, 100, 110, 120, 130, 140, 150 or even 160 micrometres. Such selection increases the antislip quality of the product and also the significance of the invention feature, as discussed in the recognition section above.

It is preferable if the average, of the top-plan-view aspect ratios, is at most 4.5, more preferably at most 4.0, more preferably at most 3.5, more preferably at most 3.0, more preferably at most 2.5, more preferably at most 2.0, more preferably at most 1.5. The advantage of such a selection is that it further decreases the sensitivity of the heat sealing operating point to the presence of the antislip protrusions.

It is preferable if the melt mass flow rate is at least 0.7 g/10 min., more preferably at least 0.8, or 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9 or even at least 4.0 g/10 min., determined at 190° C. under a load of 2.16 kg in accordance with ISO 1133-1. The advantage of such a selection is that it further decreases the mentioned sensitivity.

As concerning selecting a top limit for the melt mass flow rate, it is preferable if the first substance has a melt mass flow rate of at most 300 g/10 min. (preferably at most 250 g/10 min, more preferably at most 200 g/10 min, more preferably at most 160 g/10 min, more preferably at most 130 g/10 min, more preferably at most 100 g/10 min, more preferably at most 75 g/10 min, more preferably at most 50 g/10 min.) determined at 190° C. under a load of 2.16 kg in accordance with ISO 1133-1. Its advantages include that keeping the melt mass flow rate below the mentioned top limit can help to more easily form the undercut character of the antislip protrusions. Further, antislip protrusions of a not too high melt mass flow rate can better resist an external heat without losing their desired shapes or configurations. Namely, if the antislip protrusion happens to be heated up by the external heat and soften or melt then if it has a too high melt mass flow rate then surface energies of the antislip protrusion and of the outer surface can deform the antislip protrusion from its original undercut shape. The external heat may arise for example when the bag is heat-shrunk to its contents or when after filling and stacking the stack is covered with a shrink hood. It is preferable if the multiplicity of the antislip protrusions occupy at most 60.0% (more preferably at most 50.0%, or 40.0%, 35.0%, 30.0%, 25.0%, 20.0%, 17.5%, 15.0%, 12.5%, 10.0%, or even 8.0%) of an area of the antislip packaging material in a top plan view of the wall's roughened part taken from above the antislip protrusions. The advantage of such a selection is that it further decreases the mentioned sensitivity.

It is preferable if the antislip protrusions are of random top-plan-view sizes. Namely, each antislip protrusion has its own top-plan-view size which means the greatest extent of the antislip protrusion in a top plan view of the wall's roughened part taken from above the antislip protrusions. The advantage thereof is that it further decreases the mentioned sensitivity.

It is preferable if the antislip protrusions are fixed to the wall. It is even more preferable if the antislip protrusions are formed of particles fixed, preferably granules fused to the wall, the latter meaning involving reducing to a liquid or plastic state by heat any one or both of the particle and the outer surface fixed together. The advantage thereof is that it facilitates forming a melt mass flow rate in the antislip protrusions different from that of the outer surface, and thereby further decreases the mentioned sensitivity.

It is preferable if at least some antislip protrusions each have a volume of from 0.0000335 mm$^3$ to 524 mm$^3$. It is more preferable if the at least some antislip protrusions each have a volume of at least 0.0005234 mm$^3$, or 0.0010223 mm$^3$, or 0.0017666 mm$^3$, or 0.0028052 mm$^3$, or even 0.0041875 mm$^3$. Such selection increases the antislip quality of the product and also the significance of the invention feature, as discussed in the recognition section above. It is preferable if the antislip protrusions having the hidden surface portion have at least one undercut and include at least one area immediately above the undercut, the antislip protrusion being so dimensioned as to form a separation between the at least one area and the wall outer surface which is greater than 12 micrometres. The advantage thereof is that it increases the antislip quality of the product and also the significance of the invention feature, as discussed in the recognition section above.

It is preferable if the packaging material includes plastic woven fabric. The woven fabric can be a circularly woven or flat-woven woven fabric, e.g. woven from flat tapes or strips of e.g. polyolefins such as polypropylene and/or polyethylene. The woven fabric can optionally have one or more coat layers made e.g. with extrusion coating, on the outer surface and/or on an opposing inner surface of the wall. The woven fabric can further have further layers laminated thereto, e.g. biaxially oriented printed films adhered to the fabric with extrusion lamination or cross-linked or pressure sensitive or reactive hotmelt or low melt adhesives etc. The advantage thereof is that it surprisingly increases the significance of the invention feature, as discussed in the recognition section above.

It is preferable if the packaging bag is large enough to accommodate at least 4.5 kilograms of contents in it. In case of uncertainty, it means 4.5 kilograms of powdered ice melting salt (sodium chloride). Such selection increases the significance of the invention feature, as discussed in the recognition section above. A top limit for the filling weight could be selected, if necessary, for example about 110 kilograms.

The essence of a method invention, for making invention products above, is a method for providing an antislip, heat sealable plastic packaging bag, including providing particles of a first substance and of a suitable size and shape, the first substance being a thermoplastic polymer, providing a film blowing machine having an annular die gap and an external bubble-cooling unit above the die gap and a haul-off unit above the external bubble-cooling unit, providing a blown film bubble consisting of a plastic wall emerging from the die gap and proceeding toward the haul-off unit, the plastic wall having an outer surface of a second substance, the second substance different in some property from the first substance and suitable to fuse with the first substance, providing a neck of the bubble, in which the wall is suitably hot and plastic-state, between the die gap and a freezing line of the bubble, the freezing line being a part of the bubble where the wall is made to reach a final thickness of the wall, selecting an area, the landing area, of the neck between the die gap and the external bubble-cooling unit, where the outer surface is tacky, in the landing area bringing and sticking, with a random distribution, the particles to the outer surface of at least a part, the roughened part, of the wall, using a heat content of the suitably hot wall for starting a fusing process in the proceeding wall for fusing the stuck particles to the outer surface, ending the fusing process, by cooling, at a desired extent of the fusing for forming a suitably strong fixation between the outer surface and the particles fused to it, freezing the wall by cooling, for providing a heat sealable, plastic, flexible frozen wall, providing in the frozen wall an average surface weight of at most 500 g/m$^2$, thereby forming, from the particles fused to the wall, a multiplicity of separate antislip protrusions of the first substance randomly distributed on the outer surface of the frozen wall and projecting from the outer surface to a protrusion height of between 50 micrometres and 10000 micrometres with an average of top-plan-view aspect ratios of the multiplicity of the antislip protrusions being at least 1.0 and at most 5.0, providing at least some of the antislip protrusions (more preferably at least one twentieth of the antislip protrusions, more preferably at least one tenth of the antislip protrusions, more preferably at least a quarter of the antislip protrusions, more preferably at least a majority of the antislip protrusions) with a hidden surface portion being a portion of a free surface of the antislip protrusion which the antislip protrusion covers from a viewer in a top plan view of the wall taken from above the antislip protrusions, the frozen wall together with the antislip protrusions projecting from its outer surface constituting an antislip flexible packaging material, forming from the antislip flexible packaging material a packaging bag with the multiplicity of the antislip protrusions looking toward an outside of the packaging bag, a Novelty of the Method being selecting the first substance to have a melt mass flow rate of at least 0.6 g/10 min. determined at 190° C. under a load of 2.16 kg in accordance with ISO 1133-1.

Meanings of many of the terms in the above features were already explained under the product invention above. Providing the particles may mean, for example, providing powder particles for example of a reactor powder or a powder ground from pellets, or for example of a short flock powder, i.e. a multiplicity of short sections of a strand with a length-to-width ratio suitably low for the purpose, or the particles can be micro-pellets meaning for example short sections of a strand with a length-to-width ratio suitably near to one, the strands mentioned in these examples preferably being of a suitably low molecular orientation in order of avoiding an undesired deformation of the particles during the fusing, which can mean for example a heat shrinking capability of the strand being lower than 70% of an original strand length. The particles could also be prefabricated, for example moulded, units, though a random character in their dimensions was shown to be beneficial. Their size and shape must be suitable to provide the prescribed geometry in the formed antislip protrusions and thus they can also depend on how they are brought and fixed to the outer surface. The provided film blowing machine can be any suitable type, for example monoextruder-type or coextruder-type. The die gap is the gap in the die through which the plastic wall emerges from the die. The die gap is annular, usually having a shape of a regular circle but in theory it could as well be another (e.g. elliptic etc) closed ring. The external bubble cooling unit can be of any type, e.g. it is usually an air ring, cooling the outer surface of the wall with blowing air onto it. The air can be e.g., of room temperature or pre-cooled. The haul-off unit can also be of any suitable type, e.g. a stationary or an alternating type, the choice thereof also depending on the roughening pattern and the aimed product. The film blowing machine can have further internal and/or external bubble cooling units. It can also have double-deck or twin type air ring(s) as well. It can also have suitable iris diaphragm or similar units for protecting the bubble from air drafts, as necessary. The blown film bubble is for example provided with operating the film blowing machine, and pressing a polymer melt through the die gap, forming an airtight bubble, from the emerging wall, with a nip in the haul-off and blowing and closing air into the bubble to provide it with a desired size and shape, as is usual with film blowing. The bubble usually has a constant shape and the plastic wall which constitutes the bubble is continuously emerging from the die gap and proceeding toward the haul-off unit. The outer surface of the wall consists of a second substance and it is possible that the whole wall is of the same second substance or (e.g., in case of coextrusion) the inner part of the wall includes different substance(s). The second substance is suitable to fuse with the first substance, which means it is suitable to become blended or joined or welded with it by a melting of one or both of the substances. As usual with film blowing machines, the bubble has a lowest part, called a neck, in which the wall of the bubble has a temperature as high as keeps the wall in a plastic state, in which state it readily stretches due to its own weight and also in response to an internal overpressure of the bubble. The neck is the part of the bubble between the die gap and a freezing line of the bubble. The freezing line is the part of the bubble where the bubble reaches its final thickness, due to its there becoming cold enough therefor. A landing area is selected above the die gap and below the external bubble-cooling unit where the outer surface is tacky, i.e., where the outer surface of the wall is sticky enough for retaining at least some of the particles landing on it. The landing area is the area of the neck where particles brought to the neck land on, i.e. arrive to, the neck. It can have any suitable shape and configuration, e.g., it can surround the neck in its full perimeter or it can be formed in one or more segments of the mentioned perimeter. The landing area can have a length measured in the direction of the proceeding of the wall (the length corresponding approximately to a height of the landing area in a side view of the bubble) of any suitable extent, in practice it can be, e.g., from about 40 micrometres to several centimetres, or even decimetres in larger configurations, mainly depending on the manner the particles are brought to the landing area. The particles are brought to the outer surface for example with one or more particle dispersing units, for example with blowing the particles there with air, or the particles can be thrown onto the outer surface with an impulse having a suitably low value and a suitable direction, and/or the particle dispersing unit can include a feeder and the particles can be conveyed with the feeder which feeder can include, for example one or more belt conveyers and/or vibrational conveyers and/or some pneumatic conveyer. As we said, particles, bouncing from and heated up by the hot neck and dropping down, would have to be recollected and the higher melt mass flow rate they have, the more they will tend to stick together. As a solution, for preventing particles from dropping down from the landing area and/or the particle dispersing unit it is possible and preferable that an end, proximate to the outer surface, of the particle dispersing unit (where the particles leave the particle dispersing unit) is closer to the outer surface than 1.0 mm, or even closer than an average of the particle sizes. The proximate end is preferably cooled, preferably has an internal fluid cooling. The cooled proximate (preferably: metal, e.g., aluminium) end of the particle dispersing unit can have a contact with the outer surface, which contact can be constant or intermittent in time. The proximate end of the particle dispersing unit can be provided with a shape (as seen in a top plan view) matching the arched surface of the landing area. When a particle touches the outer surface and sticks thereto a fusing process is started, namely the heat content of the hot and tacky wall is used for heating and thereby melting the particle stuck thereto and for joining the particle to the outer surface e.g., by a melting-together of the outer surface and the particle. The wall being suitably hot means the wall has sufficient heat content for the purpose of the fusing. As the fusing process continues, the particle is being more and more fused to the outer surface which does not necessarily mean that the particle actually enters the wall or is actually embedded into the wall but rather that a contact between the particle and the outer surface is being improved and preferably an interaction on the molecular level between them in the contact surface is provided, i.e., molecules of at least one of the particle and the outer surface penetrate between molecules of the other. If that process reaches a desired extent then a cooling of the system results in a fixation of a suitable strength between the particle and the outer surface. It means that a suitable fixation is not necessarily based on any definite impinging, with a definite impulse, of the particles into the outer surface nor on a (deep) embedding of the particles into the outer surface, which is advantageous due to preserving an integrity and continuity of wall layers. If insufficient time or temperature or fusing energy is provided for the fusing process than the fixation can remain too weak, and on the other hand if the fusing process is exaggerated the resulting antislip protrusion can turn out to have a shape too low or not sharp enough. The cooling used for ending the fusing process as well as that used for freezing the wall can be provided with the external bubble-cooling unit and/or with one or more other (internal and/or external) cooling units and/or it can be provided with spontaneously cooling the bubble with ambient air. The freezing of the wall means rendering it colder than its melting or softening point. For providing a desired surface weight in the frozen wall a hot wall emerging from the die gap of a surface weight greater than the desired one is provided and the surface weight is decreased by stretching the wall vertically and/or extending the wall horizontally which process ends when the wall is fully frozen. The result is that the antislip protrusions, formed from the particles brought and fixed to the outer surface, contain the first substance. One antislip protrusion may derive from one particle or a plurality of interconnected or contacting particles, for example, some particles can stick together to form a conglomerate which, fixed to the outer surface, constitutes an antislip protrusion. As regarding the substance of the provided particles, the first substance is selected to have a melt mass flow rate of at least 0.6 g/10 min. determined at 190° C. under a load of 2.16 kg in accordance with ISO 1133-1. It means that if the particles, as they are provided, are used, as specimen, in the standard test, the test result is that the melt mass flow rate is at least 0.6 g/10 minutes.

It is important to note that in the method the packaging material can in addition have further such protrusions as are different from the antislip protrusions defined in the invention features above. Further we note that an antislip packaging material or bag, respectively, produced by the method does not in itself necessarily give teaching for the skilled person of the fact of it having been made by this method.

The advantage of the method comes from a combination of the method being simple and of that it inherently results in the invention product whose advantages were discussed above.

In preferred method embodiments method features, analogous with respective features of the preferred embodiments of the invention product mentioned above, can be selected in analogy with preferred product embodiments for providing analogous advantages.

Preferably the method includes forming the surface weight to be at most 420 g/m², more preferably at most 370, or 320, 270, 220, 200, 180, 160, 140, 130, or even 120 g/m². Such selection increases the significance of the invention feature, as discussed in the recognition section above.

Preferably the method includes forming the protrusion height to be at least 60 micrometres, more preferably at least 70, or 80, 90, 100, 110, 120, 130, 140, 150 or even 160 micrometres. Such selection increases the antislip quality of the product and also the significance of the invention feature, as discussed in the recognition section above.

Preferably the method includes forming the average, of the top-plan-view aspect ratios, to be at most 4.5, more preferably at most 4.0, more preferably at most 3.5, more preferably at most 3.0, more preferably at most 2.5, more preferably at most 2.0, more preferably at most 1.5. The advantage of such a selection is that it further decreases the sensitivity of the heat sealing operating point to the presence of the antislip protrusions.

Preferably the method includes selecting the melt mass flow rate to be at least 0.7 g/10 min., more preferably at least 0.8, or 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9 or even at least 4.0 g/10 min., determined at 190° C. under a load of 2.16 kg in accordance with ISO 1133-1. The advantage of such a selection is that it further decreases the mentioned sensitivity. Preferably the method includes selecting the first substance to have a melt mass flow rate of at most 300 g/10 min. (preferably at most 250 g/10 min, more preferably at most 200 g/10 min, more preferably at most 160 g/10 min, more preferably at most 130 g/10 min, more preferably at most 100 g/10 min, more preferably at most 75 g/10 min, more preferably at most 50 g/10 min.) determined at 190° C. under a load of 2.16 kg in accordance with ISO 1133-1. Keeping the melt mass flow rate below the mentioned top limit can help to more easily form the undercut character of the antislip protrusions.

Preferably the method includes forming the antislip protrusions occupying at most 60% of an area of the antislip packaging material in a top plan view of the wall roughened part taken from above the antislip protrusions.

Preferably the method includes forming the antislip protrusions of random top-plan-view sizes.

Preferably the method includes forming at least some antislip protrusions each having a volume of from 0.0000335 mm³ to 524 mm³.

Preferably the method includes forming the antislip protrusions that have the hidden surface portion having at least one undercut and including at least one area immediately above the undercut, the antislip protrusion being so dimensioned as to form a separation between the at least one area and the wall outer surface which is greater than 12 micrometres.

Preferably the method includes forming the packaging bag large enough to accommodate at least 4.5 kilograms of contents in it.

Further, preferably the method further includes
providing an outer diameter of the die gap,
providing an expanding area of the neck in which the proceeding wall, carrying the particles stuck thereto, is exposed to a horizontal expansion, the expanding area provided with a shape in which planes tangent to the outer surface close angles, the angles of expansion, of at least 2.5 degrees with the vertical, and
providing a first vertical distance, in a side view of the bubble, between the landing area and the expanding area which first vertical distance is either zero or at most equals 2.0 times the die gap outer diameter.

If the annular die gap is not exactly circular then the outer diameter is the greatest available outer diameter of the die gap. The neck can have one expanding area or it can have a plurality of separate expanding areas. The expanding area of the neck has a suitable shape which means that any geometric plane, tangent to a point of the outer surface in the expanding area of the neck, is not vertical but closes an angle (the angle of expansion) with the vertical and the angle of expansion is at least 2.5 degrees. For example in a side view of the bubble two opposing (e.g. left- and right-side) such tangent planes close with each other an angle of at least 5.0 degrees if the bubble is regular and symmetrical, which constitutes a definitely divergent path of the wall, i.e., bubble shape, in the expanding area. Further, for example, in the method, either the landing area and the expanding area have a common subset (i.e., at least some particles are made to land in the expanding area) in which case the first vertical distance is provided to be zero, or a first vertical distance between the (disjunct) landing area and expanding area thereabove is positive and at most a double of the die gap outer diameter. The first vertical distance between them can for example be measured in a side elevation of the arrangement. The advantage of the method embodiment is that this way the particles, travelling with the proceeding wall, get far enough from each other in all directions before they can get as hot as to stick to each other. A deeper analysis thereto can be found in the recognition section above.

Preferably, in the method, each of at least some of the multiplicity of separate antislip protrusions is formed from a single particle. Its advantage is that it provides a suitably great number of antislip protrusions from a given number of particles, exploiting the preferred feature above.

Preferably, in the method, the angles of expansion are at least 3.0 degrees, more preferably 5.0 degrees, more preferably 7.5 degrees, more preferably 10.0 degrees, more preferably 12.5 degrees, more preferably 15.0 degrees, more preferably 17.5 degrees. The advantage thereof is that this way the particles are even more effectively prevented from sticking to each other. A top limit for the angles of expansion could be selected, if necessary, for example about 85.0 degrees.

Preferably, in the method, the first vertical distance at most equals 1.8 times, more preferably 1.5 times, more preferably 1.3 times, more preferably 1.1 times, more preferably 1.0 times, more preferably 0.8 times, more preferably 0.5 times, more preferably 0.3 times the die gap outer diameter.

The essence of an apparatus invention is an apparatus for roughening a blown film, the apparatus constituting a sub-unit for a film blowing machine, the film blowing machine for producing a blown film plastic wall for a packaging material, the apparatus including
a film blowing die head with an annular die gap, and
an external cooling air ring above the die head,
the die gap having an outer diameter, and
the air ring having a bottom,
the die gap and the air ring together suitable to define a path of an outer surface of the plastic wall, the path having a shape of a bubble extending from the die gap up through the air ring, and at least above the air ring bottom the bubble having one or more expanding areas in which the wall is exposed to a horizontal expansion and planes tangent to the path close angles, the angles of expansion, of at least 2.5 degrees with the vertical, the sub-unit further including a particle-dispersing unit defining a landing area of the path by being suitable for dispersing in the landing area, with a random distribution, thermoplastic polymer particles on the outer surface between the die gap and the air ring, the apparatus being new in any one or both of a.) a second vertical distance, in a side view of the apparatus, between the landing area and the air ring bottom being either zero or at most 2.0 times the die gap outer diameter, and b.) at least one of the one or more expanding areas including at least a part of the landing area.

Meanings of many of the terms in the above features were already explained under the product invention above. The invention apparatus is a sub-unit suitable to be used in such a film blowing machine as is suitable to produce a blown film plastic wall for a packaging material, or even a packaging bag therefrom. As it is known, such a film blowing machine is suitable to produce a packaging film of an average wall surface weight of at most 500 g/m$^2$, from a suitable material and with a suitable adjusting of its components. The film blowing machine, as an environment in which the invention sub-unit can be used, can be of any suitable type, for example monoextruder-type or coextruder-type, and the rest of the film blowing machine, without the invention sub-unit, would, as it is known per se, typically include one or more extruders, screen unit(s) for filtering the extruded melt, a tower with a haul-off unit atop the tower and with film-guiding means in the tower both upstream and downstream the haul-off unit, and one or more rewinding units or in-line bag-making units, and optional in-line printer(s) and suitable control unit(s). The complete film blowing machine, together with the invention sub-unit, typically processes polymer raw material (in the form of pellets and/or flakes/and or powder etc.) into blown film as follows. The extruder(s) transform the polymer raw material into a melt, and press the melt through the screen unit(s) into the die head of the sub-unit. The melt is made to emerge from the die gap and to pass, in form of a bubble, up through the air ring of the sub-unit. Film-guiding means of the complete film blowing machine typically collapse the bubble into a flattened (optionally side gusseted) tube above the air ring, the haul-off unit pulls up the flattened tube which is then forwarded through the further film-guiding means to the rewinding units (where it is rewound for example as a tube or as a single-wound sheet) or to the in-line bag making unit(s) where it is converted into packaging bags. Such an environment, in which our invention sub-unit is to be used, can include one or more internal and/or external film cooling units further to the air ring of the sub-unit. Now coming to details of the invention apparatus, the die head can be of single- or multilayer type, for mono- or coextrusion, respectively, and the die head preferably includes an air inlet for an inflating of the bubble. A usually horizontal top of the die head can include the die gap. The die gap is annular, usually having a shape of a regular circle but in theory it could as well be another (e.g., somewhat elliptic etc.) closed ring. If the annular die gap is not exactly circular then the outer diameter is the greatest available outer diameter of the die gap. The external cooling air ring can be of any suitable type for cooling the outer surface of the wall with blowing air onto it. The air can be, for example, of room temperature or pre-cooled. It can, in general, be a double-deck or twin type air ring as well. The bottom of the air ring is the lowest point of the air ring. The die gap and the air ring are together suitable to define the path of the outer surface of the plastic wall. The mentioned "together defining" is based, for example, on the outer diameter of the die gap (which is known to be in a nearly linear correlation to the kg/h output of the die), a thickness (i.e., the dimension perpendicular to a perimeter) of the die gap (which is also known to influence the kg/h output of the die as well as a thickness of the melt leaving the die gap), an effective cooling power of the air ring (which is based on a combination of its air blow capacity expressed in air litres/min and its lip- and air-guiding configuration, and expresses how much film it can practically cool down, in film kg/h), an inner diameter of the air ring (being the size of the widest vertical cylinder fitting into the central opening of the air ring) and a vertical altitude of the air ring bottom above the die gap. It is clear for the skilled person that the mentioned parameters can influence a shape and thickness-profile of the whole bubble. During operation, the bubble usually has a constant shape and the plastic wall which constitutes the bubble is continuously emerging from the die gap and proceeding up through the central opening of the air ring toward the haul-off unit. In an expanding area of the bubble one can see, that the wall is exposed to a horizontal expansion, from the diverging (i.e., progressively widening upward) shape of the bubble. The bubble can have one expanding area or it can have a plurality of separate expanding areas. The expanding area of the bubble has a suitable shape which means that any geometric plane, tangent to a point of the outer surface in the expanding area of the bubble, is not vertical but closes an angle (the angle of expansion) with the vertical and the angle of expansion is at least 2.5 degrees. For example in a side view of the bubble two opposing (e.g. left- and right-side) such tangent planes close with each other an angle of at least 5.0 degrees if the bubble is regular and symmetrical, which constitutes a definitely divergent path of the wall, i.e. bubble shape, in the expanding area. In the invention sub-unit the die gap and the air ring are suitable to define such a path as has expanding area(s) at least above the bottom of the air ring. This typically means that the air ring has sufficient effective cooling power to freeze the bubble and the skilled person will understand that an altitude, of the expanding area above the air ring bottom, can be defined with adjusting the effective cooling powder and/or lip- and air-guiding configuration of the air ring relative to a "kg/h"-throughput of the wall, for example the expanding area can be brought down partly or fully into the air ring, i.e., to immediately above the air ring bottom, with a suitable setting thereof. The sub-unit further includes a particle-dispersing unit which means it includes at least one such unit. The particle-dispersing unit can be any unit, placed with any position and orientation, suitable for dispersing with a random distribution thermoplastic polymer particles on the outer surface between the die gap and the air ring. The term "with a random distribution" means with a random distribution on the micro-scale, i.e., in respect of a relation of one particle to another. The term "between the die gap and the air ring" means above the die gap and below at least a portion of the air ring. In the most practicable cases, however, it will mean below the bottom of the air ring. The dispersing of the particles on the outer surface means bringing the (preferably unmelted, solid) particles into a contact with the outer surface in a way in which at least some, preferably at least a majority, of the particles stick to the outer surface. The particle-dispersing unit can, for example, include a blower for blowing the particles to the outer surface with air, and/or it can include an impeller or a similar unit for throwing the particles onto the outer surface with an impulse having a suitably low value and a suitable direction, and/or the particle dispersing unit can include a feeder and the particles can be conveyed toward the outer surface with the feeder which feeder can include, for example one or more belt conveyers and/or vibrational conveyers and/or some pneumatic conveyers, etc. The particle dispersing unit can include a (preferably: internal) cooling for a protection against the heat of the bubble, with respect to the conveyed particles being of thermoplastic polymer. In practice, the particle-dispersing unit can be a unit for bringing and sticking thermoplastic polymer powder to the hot outer surface, which powder can be, for example, any one or more of ground powder, reactor powder, precipitated powder, micropellets, flock powder, etc. It is possible that the particle dispersing unit is alternatingly rotated about a vertical axis of the bubble synchronously with an alternating rotation of the haul-off unit in order of keeping a predetermined roughening pattern in the wall despite the alternating motion of the haul-off unit. The area of the outer surface where the particles land, i.e., essentially where the mentioned dispersing takes place, is called the landing area of the path. The landing area can be selected by selecting a suitable type, location and orientation, and also a suitable adjusting of the particle-dispersing unit. The landing area can, for example, include a whole perimeter of the bubble or one or more segments thereof. As we mentioned, it is an object to provide the invention apparatus specifically designed for a mentioned blown-film-roughening process embodiment in which such a landing area is selected as is either in an expanding area or at east not too far below an expanding area, all in order of avoiding a sticking-together of the dispersed, receding particles having a relatively high melt mass flow rate. That is why, in the apparatus, at least one of the two features a.) and b.) is met. Feature a.) is that a second vertical distance, in a side view of the apparatus, between the landing area and the air ring bottom is either zero or at most 2.0 times the die gap outer diameter. It means that an altitude of the landing area can reach an altitude of the air ring bottom, or if it does not reach that then it is not farther below the air ring bottom than a double of the die gap outer diameter. Namely, as we said, if the expanding area is brought down, by the operator, to the air ring bottom, this apparatus feature corresponds to the mentioned process feature of "providing a first vertical distance, in a side view of the bubble, between the landing area and the expanding area which first vertical distance is either zero or at most equals 2.0 times the die gap outer diameter". Feature b.) is that at least one of the one or more expanding areas includes at least a part of the landing area, which means that the landing area and the expanding area have a common subset (i.e., at least some particles are made to land in the expanding area) in which case the first vertical distance is provided to be zero. Such a configuration, i.e., in which the bubble is suitably divergent already under the air ring, can be provided with a suitable selection of a ratio between the inner diameter of the air ring and the outer diameter of the die gap (i.e., the air ring should have a wide-enough central opening relative to the die gap to provide a sufficiently greater bubble diameter at the air ring bottom than above the die gap), and/or with a suitable selection of the configuration, and adjusting, of the air ring in order to realise a bubble diameter at the air ring bottom as close to the inner diameter of the air ring as possible (e.g., with adjusting the effective cooling power and/or lip- and air-guiding configuration of the air ring), and/or with a suitable selection of a ratio between air ring bottom altitude above the die gap and die gap outer diameter (namely, because if the air ring configuration essentially determines a bubble diameter at the air ring bottom and the die head configuration essentially determines another bubble diameter above the die gap then an angle of expansion is essentially further determined with a suitable selection of the altitude of the air ring bottom above the die gap).

The advantage of the apparatus is that it is specifically designed for and can be used for the execution of the mentioned process embodiment.

Preferably, in the apparatus, the angles of expansion are at least 3.0 degrees, more preferably 5.0 degrees, more preferably 7.5 degrees, more preferably 10.0 degrees, more preferably 12.5 degrees, more preferably 15.0 degrees, more preferably 17.5 degrees. The advantage thereof is that this way the particles are even more effectively prevented from sticking to each other. A top limit for the angles of expansion could be selected, if necessary, for example about 85.0 degrees.

Preferably, in the apparatus, the second vertical distance at most equals 1.8 times, more preferably 1.5 times, more preferably 1.3 times, more preferably 1.1 times, more preferably 1.0 times, more preferably 0.8 times, more preferably 0.5 times, more preferably 0.3 times the die gap outer diameter.

Preferably, in the apparatus, an end, proximate to the outer surface, of the particle dispersing unit is suitable to be closer to the outer surface than 1.0 mm. The proximate end is preferably cooled, preferably has an internal fluid cooling. More preferably, the proximate (preferably: metal, e.g., aluminium) end of the particle dispersing unit is suitable to be cooled and to have a contact with the outer surface, the contact being either constant or intermittent in time. Even more preferably, the contact is constant in time. It is based on the fact that a melted polymer (and particularly polyolefins used for packaging purposes) can be prevented from sticking to another (e.g., metal) surface if a temperature of the other surface is maintained under the melting temperature of the polymer. The contact should be provided with an expressly low, practicably the lowest possible pressure between the contacting surfaces, because a suitably low pressure provided can minimise the heat-flow from the outer surface into the proximate end and can minimise (in fact in practice: avoid) any undesired deformation of the bubble.

The advantage thereof is that it makes it possible to forward the particles from the particle dispersing unit to the outer surface without a risk of the particles dropping down. That makes a recollection of the particles unnecessary which has special advantages with relatively high-melt-mass-flow particles prone to sticking together at recollection, as we mentioned earlier. Preferably, the proximate end of the particle dispersing unit has a shape, in a top plan view, matching an arched surface of the landing area.

Preferably, the particle dispersing unit includes a feeder for conveying the particles toward the outer surface and the proximate end of the particle dispersing unit is constituted by an end, proximate to the outer surface, of the feeder. The feeder can include, for example one or more belt conveyers and/or vibrational conveyers and/or some pneumatic conveyers. The advantage thereof is its simplicity and possibly small height.

Preferably, in the apparatus, the air ring is either a dual-lip type air ring or an air ring having more than two cooling-air-orifices. As it is known, the dual-lip air ring means an air ring with two annular cooling-air-orifices from which useful cooling air goes out to cool and shape the bubble. Its advantage is that it can help to provide a divergent, expanding bubble shape already under the air ring bottom.

Preferably, the apparatus further includes a wind shield between a level of the air ring bottom and a top level of at least a part of the landing area for an at least partial protecting of the at least a part of the landing area from a wind of the air ring. The wind shield can be any device suitable to perform the protection. In a practical case it can be a flat metal plate with a circular hole in it, the circular hole for enclosing the bubble with a suitably narrow gap maintained between the wind shield and the outer surface. It is also possible to maintain a positive (though preferably weak) contact between the wind shield and the outer surface, if the wind shield is kept cool enough. The wind shield can, for example, be built from two halves, dimensioned for a particular bubble size, and, e.g., mounted to the air ring bottom from under. Alternatively, it can be, for example, a suitable (preferably: low-profile) iris diaphragm or any similar unit for the protecting of the at least a part of the landing area from air drafts generated through the central opening of the air ring, adjacently the bubble. Such undesired wind or air draft, blowing either downward or (rarely) upward, is more typical with plural-lip type air rings than with single-lip type ones and the closer the landing area to the air ring bottom is, the greater the problem can be (i.e., the problem of the wind possibly blowing particles off the landing area and/or the proximate end of the particle dispersing unit). Its advantage is that it helps to make it unnecessary to provide a recollection of the particles and that it makes it possible to provide the landing area close to the air ring bottom. More preferably, the wind shield is an active wind shield including a chamber having a top and a bottom and an opening proximate and toward the wall's outer surface, for conducting the wind at least partly through the proximate opening and through the chamber for at least partly protecting the landing area under the chamber bottom from the wind. Practicably the wind shield chamber can be built up from two similar flat metal plates, one above the other, with circular holes for the bubble in them. A suction unit, regulated for providing a suitably constant pressure, for example either under the chamber proximate opening or at the chamber outer perimeter, can be provided along an outer perimeter of the chamber to channel the wind through the proximate opening and through the chamber, between its top and bottom, away from the bubble. (If, however, the wind is directed upward, then a regulated overpressure can be provided instead of a suction and the wind can be conducted through the chamber, between its top and bottom, and through the chamber proximate opening facing the outer surface.) This provides the advantage that even greater air drafts or winds can be suitably extinguished which makes it possible to provide an even more emphasised divergence in the shape of the bubble under the air ring bottom and to provide the landing area close to the air ring bottom, particularly if the chamber is formed to have a low profile.

Preferably, in the apparatus, a third vertical distance, in a side view of the apparatus, between the landing area and the die gap is either zero or at most 70 mm. Its advantage is that it can act to counterbalance a possibly premature particle-cooling effect from the air ring being relatively close above the landing area. More preferably, the third vertical distance is at most 65 mm, more preferably at most 60 mm, more preferably at most 55 mm, more preferably at most 50 mm, more preferably at most 45 mm, more preferably at most 40 mm, more preferably at most 35 mm, more preferably at most 30 mm, more preferably at most 25 mm, more preferably at most 20 mm.

DETAILED DESCRIPTION

EXAMPLES

Figure 1:
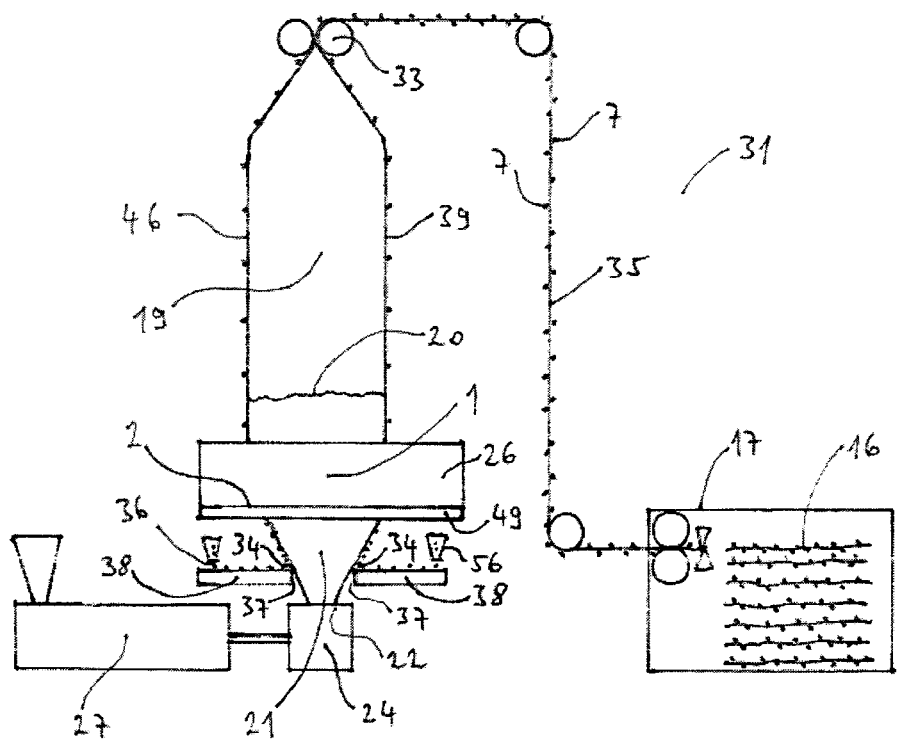
FIG. 1. is a schematic side view of a film blowing machine (not in scale).
Figure 2:
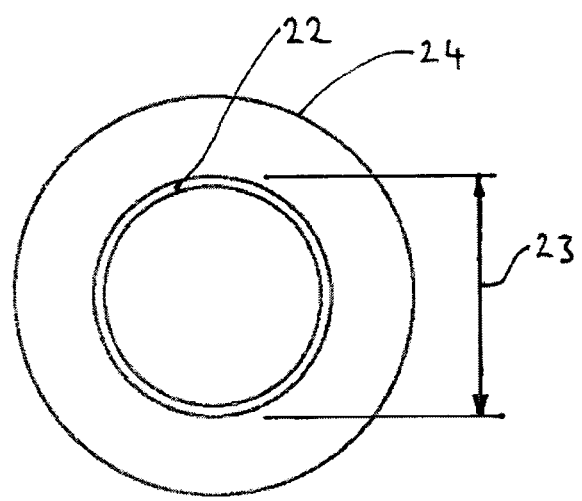
FIG. 2. is a film blowing die head in top plan view.
Figure 3A:
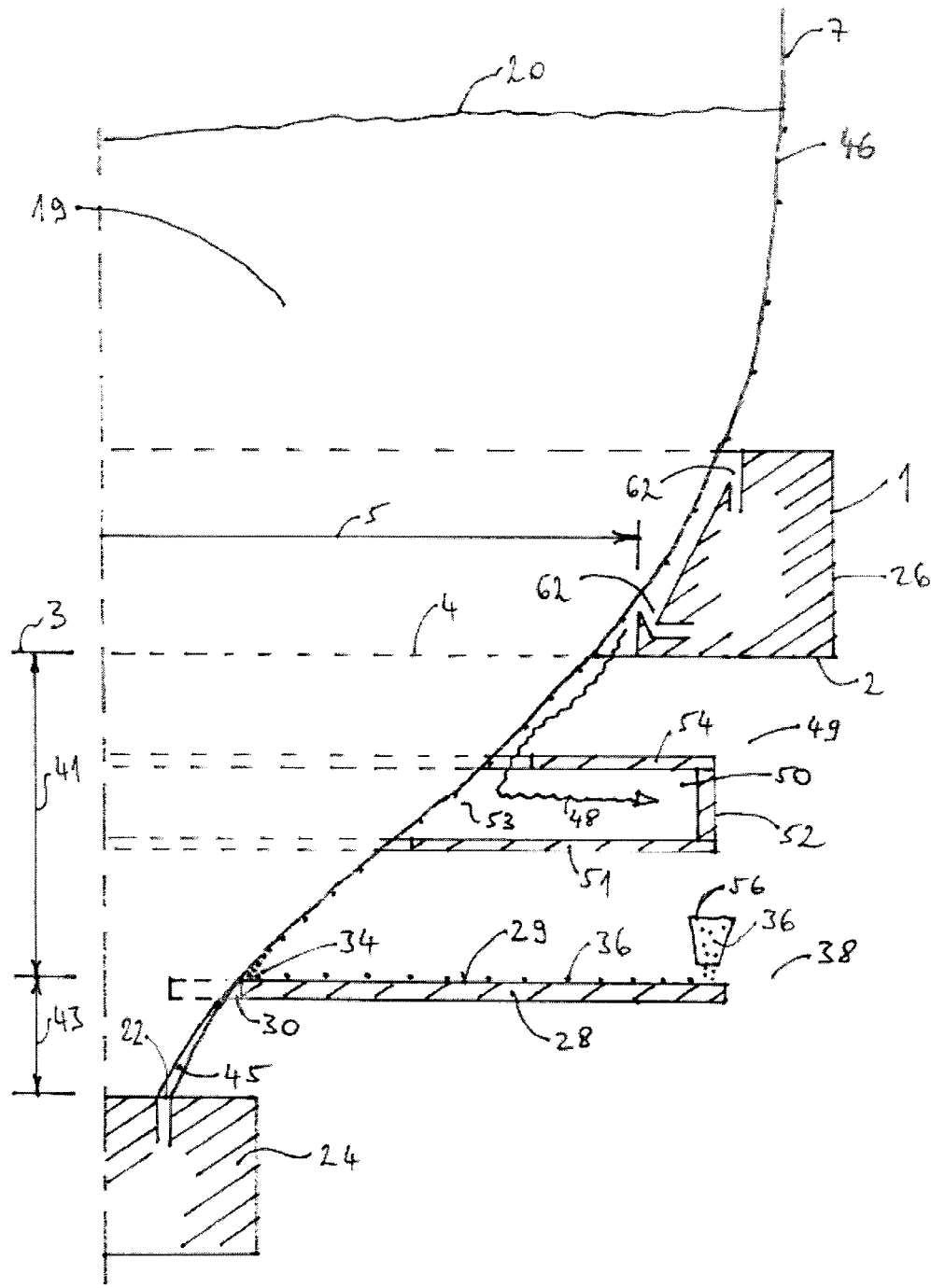
FIG. 3a. is a schematic vertical section of an apparatus for roughening a blown film (not in scale).
Figure 3B:
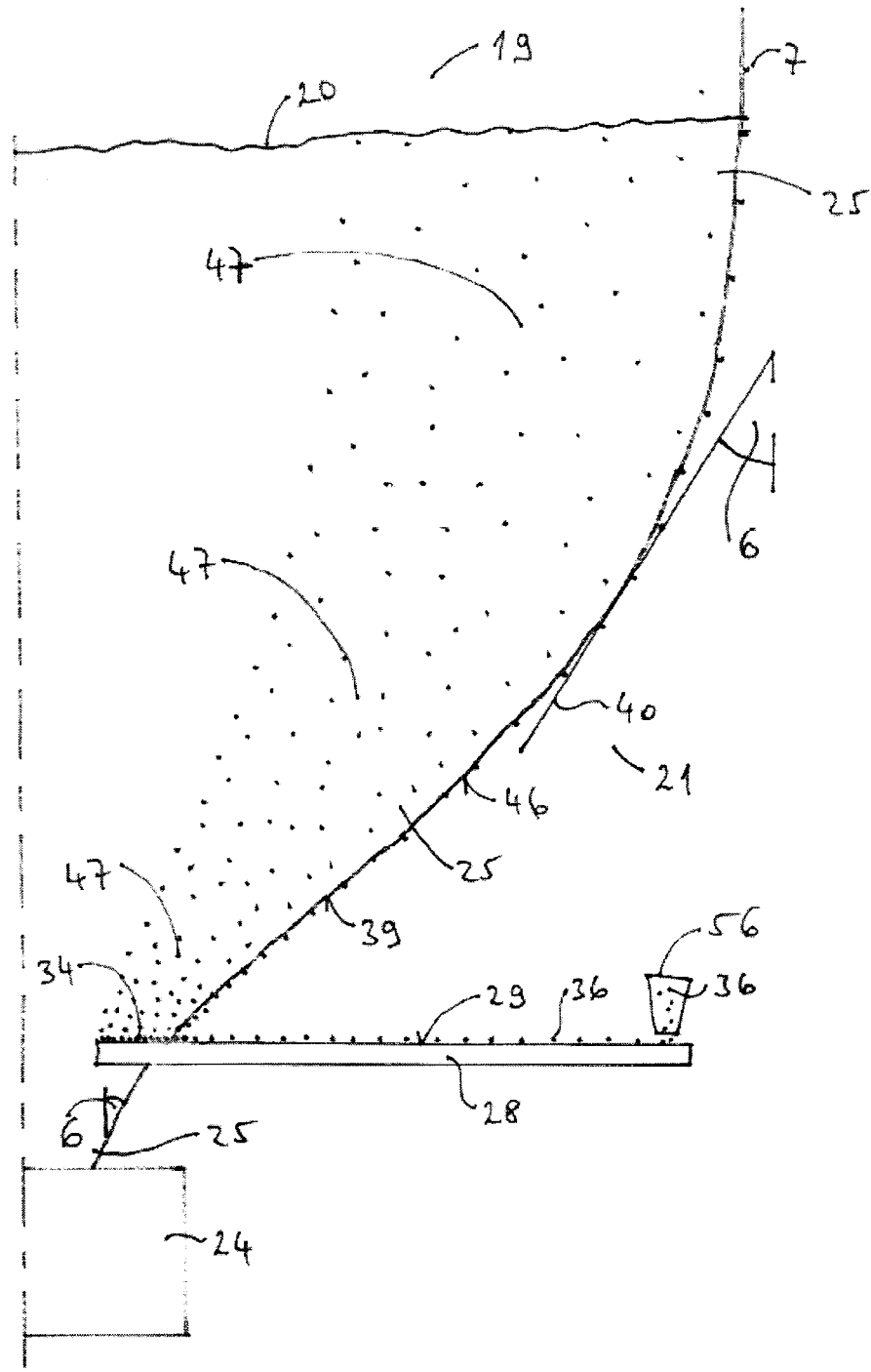
FIG. 3b. is a schematic side view of an apparatus for roughening a blown film, with certain parts not shown for easier reading (not in scale).
Figure 4:
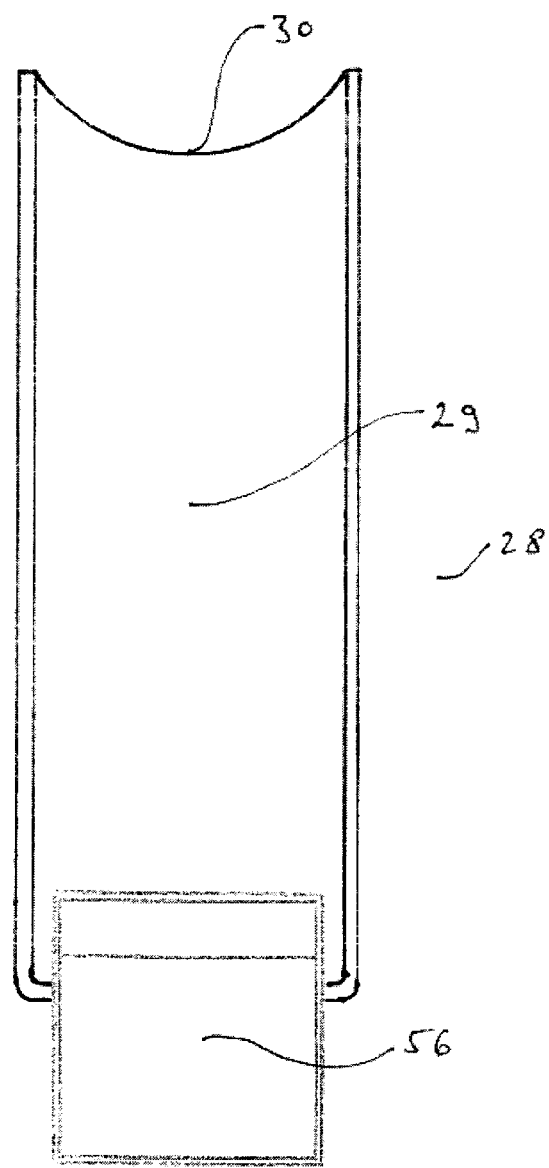
FIG. 4. is a top plan view of a particle dispersing unit.

Example 1: a Comparative Example (Welding Tests)

We made comparative welding tests with antislip flexible packaging materials. In each welding sample, two identical specimens of a selected roughened (or, in the reference case: plane, not roughened) polyethylene film type were overlapped, both of them looking upwards with their roughened sides, and were welded together with an impulse sealer. The impulse sealer was of a type Unifol 32 (made by company Unifol kft, Hungary) and included two similar flat heating wires (of a width of 2.4 mm) facing each other, providing a double-sided welding of the samples, simulating a package forming welding operation. In each sample, the welding was made starting with a uniformly cold welding apparatus, applying uniform pressures and uniform heating currents in each case. To each film type we found out, by trial and error, the shortest welding time necessary for a good-quality welding of the given film type. That way, each film type we characterised with a time value, the time found necessary for suitably welding the film type. The polyethylene base film wall was identical in all of the cases, the roughened films were roughened with high density polyethylene (HDPE) powder particles welded to one side of the base film, the roughening particles were approximately of the same sizes and used in approximately the same quantity ($g/m^2$) in each case and only the polymer of the roughening particles differed essentially, from case to case, in the melt mass flow rate (MFR). The film types we prepared and used were as follows:

Film type 1.: Base film, without roughening: monoextruded, 100 micrometres thick, LDPE+LLDPE blend.

Film type 2.: Base film+roughening. Data of the roughening particles: Abifor's "Abifor® 1300/20" HDPE powder, size: "80-200 micrometres", melting range (Kofler method): 126-130° C., melt mass flow rate: 20 g/10 min (2.16 kg, 190° C.).

Film type 3.: Base film+roughening. Data of the roughening particles: Rowak's "Rowalit® N100-3" HDPE powder, size: "100-220 micrometres", melting range (DSC): 130-135° C., melt mass flow rate: 4 g/10 min (2.16 kg, 190° C.).

Film type 4.: Base film+roughening. Data of the roughening particles: Solvay's "Eltex® B 4002" HDPE powder, size: "100-200 micrometres", main melting point: 132° C., melt mass flow rate: 0.25 g/10 min (2.16 kg, 190° C.).

The test results:

|  | Welding time | Welding time in % |
|---|---|---|
| Film type 1. (Base film) | 2.0 sec | 100% |
| Film type 2. (Roughening MFR: 20 g/10 min) | 2.2 sec | 110% |
| Film type 3. (Roughening MFR: 4 g/10 min) | 2.4 sec | 120% |
| Film type 4. (Roughening MFR: 0.25 g/10 min) | 3.2 sec | 160% |

This provides an exact illustration to our general experience that low fractional-melt-mass-flow-rate (-MFR) powders change the welding operating point to the greatest extent relative to that of the non-roughened film, and the higher the melt mass flow rate of the roughening particles is, the nearer the welding operating point, to that of the non-roughened film, is.

Example 2: Apparatus, Method and Product

See the Figures, especially FIGS. 1-5a, 6-7. Note that in FIG. 3b the wind shield 49 and the air ring 1 are not shown, for an easier understanding of the figure. This example is based on real life test runs. The film blowing machine 31 that we use is monoextrusion-type, with a single extruder 27 and internal bubble cooling (not shown), for producing a blown film plastic wall 45 for a packaging material 35. The invention apparatus, constituting a sub-unit in the film blowing machine 31, includes a film blowing die head 24 with an annular die gap 22, of an outer diameter 23 of 90 mm, and above the die head 24, as an external bubble cooling unit 26, an external cooling air ring 1 of an inner diameter 5 of 125 mm. The air ring 1 is of a dual-lip type, i.e., it has two cooling-air-orifices 62. The die gap 22 and the air ring 1 together define a path 39 of an outer surface 46 of the plastic wall 45, the path 39 having a shape of a bubble 19 extending from the die gap 22 up through the central opening 4 of the air ring 1. The bubble 19 has an expanding area 25 both under and above the air ring bottom 2. In the most divergent part of the path 39 under the air ring bottom 2 the planes 40 tangent to the path 39 close an angle of expansion 6 of about 12 degrees with the vertical. The greatest angle of expansion 6 which is believed to be about 25 mm above the air ring bottom 2 is estimated to be about 35 degrees, closed with the vertical. The sub-unit further includes two, uniform, oppositely placed and uniformly operated particle-dispersing units 38 each of which is a linear vibrational feeder 28, having a hopper 56 for storing the particles 36 and having a floor 29, for conveying the particles 36 on its floor 29 toward the outer surface 46 and the particle dispersing unit-proximate end 37 is constituted by the internally water-cooled feeder-proximate end 30 and its shape, in a top plan view, matches the arched surface of the outer surface 46. The cooled, arched feeder-proximate end 30 is suitable to have a constant contact, of a positive but very low force, with the hot outer surface 46. The particle-dispersing unit 38 defines the landing area 34 of the path 39 by being suitable for dispersing in the landing area 34, with a random distribution, thermoplastic polymer particles 36 on the outer surface 46 between the die gap 22 and the air ring 1. Essentially, in this example, the landing area 34 is the line of the outer surface 46 where the outer surface 46 contacts the floor 29 of the feeder 28. The landing area 34 is in the mentioned expanding area 25 under the air ring bottom 2. The second vertical distance 41, in a side view of the apparatus, between the landing area 34 and the air ring bottom 2 is 30 mm. The third vertical distance 43, in a side view of the apparatus, between the landing area 34 and the die gap 22 is 15 mm. The apparatus further includes a wind shield 49 between the air ring bottom level 3 and the top level 44 of the landing area 34/feeder floor 29 for protecting the landing area 34 from a wind 48 of the air ring 1. The wind shield 49 is an active wind shield 49 including a wind shield chamber 50 having a top 54 and a bottom 51 and a height of about 16 mm. It is built up from two similar though not fully uniform flat metal plates, one above the other, with circular holes, for the bubble 19, in them, whose diameters are 108 mm (in the wind shield chamber top 54) and 101 mm (in the wind shield chamber bottom 51), respectively. The wind shield chamber 50 thus has an annular opening 53 proximate and toward the wall outer surface 46, for conducting the wind 48 at least partly through the proximate opening 53 and through the wind shield chamber 50 for at least partly protecting the landing area 34 under the wind shield chamber bottom 51 from the wind 48. A suction unit (not shown) is attached to the wind shield chamber outer perimeter 52 for conducting wind 48 through the proximate opening 53 and through the wind shield chamber 50, between its top 54 and bottom 51, away from the bubble 19. The film blowing machine 31 further includes a haul-off unit 33, and could include an in-line bag making unit 17 at the end of the line.

To provide the particles 36, we provide a ground powder from company Rowak, of type "Rowalit® N100-6" of a particle size of 160-300 micrometres. The material of the powder, i.e., the first substance, is high density polyethylene of a density between 940 and 970 kg/m$^3$, melting range (DSC): 128-130° C., vicat softening point (ISO 306): 126° C., melt mass flow rate (ISO 1133-1, 190° C./2.16 kg): 6 g/10 minutes. The shape of the particles 36 is random and roughly spherical, as is known to the skilled person in respect of a good-quality polymer powder, having good flow properties, made with pellet-grinding for scatter coater application. We feed the extruder 27 with a polymer, the second substance, a blend of 40% linear low density polyethylene, 20% medium density polyethylene and 40% low density polyethylene. The second substance has a density of 922 kg/m$^3$ and a melt mass flow rate (ISO 1133-1, 190° C./2.16 kg) of 0.73 g/10 minutes. The first substance and the second substance are suitable to fuse with each other. The heated extruder 27 is operated to press the melt out through the heated die gap 22 and that is how a plastic wall 45 emerging from the die gap 22 is provided. The haul-off unit 33 is operated, without alternation, to pull up the wall 45 and a blown film bubble 19, consisting of the proceeding wall 45, is formed, whose volume is adjusted with blowing a suitable quantity of inflating air into the bubble 19. As the wall 45 proceeds toward the haul-off unit 33, it is exposed to a cooling and a forming. With adjusting the extruder 27 speed and the haul-off unit 33 speed a final bubble 19 perimeter of 980 mm is set and in the frozen wall 45 a surface weight of 92.2 g/m$^2$, is provided. The outer surface 46 of the wall 45 consists of the second substance. The air ring 1 is fed with cooling air from a fan (not shown). For example by adjusting the volume and temperature of the cooling air and the air ring 1 lip settings, it is possible to adjust the shape of the bubble 19 thus mutually defined by the die gap 22 and the air ring 1. The part of the bubble 19 between the die gap 22 and the bubble freezing line 20, where the wall 45 reaches its final thickness, i.e., the bubble neck 21, is kept so hot, from the heat of the extruder 27 and of the die head 24, as keeps the wall 45 in it in a plastic state. The top of the neck 21 is configured to be above the air ring 1 in this example. We adjust a suitable airflow from the lower cooling-air-orifice 62 of the air ring 1 and thereby use a venturi force to keep the neck 21 close to the air ring 1 in the air ring central opening 4. Simultaneously, we keep the air ring bottom 2 at a distance of about 45 mm from the die gap 22, i.e., relatively near to the die gap 22, as compared to the background art. By combining it with the fact that the air ring inner diameter 5 is selected significantly greater than the die gap outer diameter 23, we provide a shape of the neck 21 having a single expanding area 25 from the die gap 22 to above the air ring 1, in which expanding area 25 the neck 21 is made to expand to its final perimeter. The feeder 28 is operated and is used for bringing and sticking, with a random distribution, the particles 36 to the hot outer surface 46 in the landing area 34, where the outer surface 46 is tacky. The landing area 34 is selected in the expanding area 25 and therefore the first vertical distance 32, in a side view of the bubble 19, between the landing area 34 and the expanding area 25 is provided to be zero. The internal water-cooling (not shown) of the feeder proximate end 30 is operated and thereby the feeder 28 is prevented from getting as hot as to possibly soften or stick the particles 36 carried, despite the fact that it is kept in constant contact with the hot and tacky outer surface 46. A cooling water temperature of about 25° C. is suitable. Warmer water could lead to a blocking of the particle 36 flow due to heat and much colder water could lead to moisture condensation possibly leading to a blocking of the particle 36 flow due to wet particles 36. A width of the feeder floor 29, used for the bringing and sticking of the particles 36, is selected to be 90 mm and thereby a strip-shaped roughened part 47, of a width of 320 mm, of the wall 45 is defined. When the particle 36 reaches the hot outer surface 46 in the landing area 34, the heat content of the hot wall 45 is used for starting the fusing process in which the particle 36 is fused to the wall 45. As the wall 45 is kept proceeding by the haul-off unit 33, the particle 36 is given time, spent on the hot wall 45, for the fusing. The fusing process is brought to an end by cooling, at a desired extent of the fusing for forming a suitably strong fixation between the outer surface 46 and the particle 36 fused to it. It is essentially the air ring 1 that is used to provide the mentioned cooling. The configuration detailed above provides a good fixation for the mentioned particles 36. We can further adjust, or fine-tune, the fixation for example with adjusting the die head 24 temperature or melt temperature and/or the extruder 27 throughput. The given arrangement can be used to produce the wall 45, without regard to the roughening, at melt temperatures of between about 170° C. and about 220° C. With regard to the roughening, we got the best result with a melt temperature of about 215° C. and an extruder 27 throughput of about 60 kg/h. Further useful rules that we found are that if a given powder grade is welded too weakly (or too strongly) then using a smaller (or larger) powder size, of the same powder polymer, can in itself solve the problem and further that if a given configuration results in a too weak (or too strong) particle 36-welding then adjusting the air ring 1 to provide from the upper cooling-air-orifice 62 a thinner (or thicker) cooling air layer (with the same orientation, air speed and air temperature) can in itself solve the problem. All these measures proved for us suitable for effectively controlling the fusing process (with powder polymers of a melt mass flow rate from 0.25 to 20 g/10 minutes and with wall 45 surface weights of from 23 g/m² to 140 g/m²) without essentially compromising the film blowing process. Further, in the example process, the suction unit (not shown), is used for providing a suitably constant pressure value at the wind shield chamber outer perimeter 52. Such a pressure value is selected (empirically) for the purpose, at which the wind 48, blown back from the air ring central opening 4 beside the bubble 19 does not reach the landing area 34, but enters the wind shield chamber proximate opening 53, instead. After the wall 45 proceeds up from the air ring 1, it gains its final dimensions and the fixation of the particles 36 is also finalised. Thereby, from the particles 36 fused to the wall 45, we form a multiplicity of separate antislip protrusions 7 of the first substance randomly distributed on the outer surface 46 of the frozen wall 45 and projecting from the outer surface 46 to a typical protrusion height 11 of between about 130 micrometres and 270 micrometres with an average of top-plan-view aspect ratios of the multiplicity of the antislip protrusions 7 being at most 1.5. Each separate antislip protrusion 7 (except very few) is formed from a single powder particle 36. The tube-form frozen wall 45 together with the antislip protrusions 7 projecting from its outer surface 46 constitutes an antislip flexible packaging material 35, as it is forwarded downstream the haul-off unit 33. The tube-form packaging material 35 could be lead into the in-line bag making unit 17 at the end of the line for forming from the antislip flexible packaging material 35 packaging bags 16 with the multiplicity of the antislip protrusions 7 looking to an outside 18 of the packaging bag 16.

The example antislip, heat sealable plastic packaging bag 16, made with the apparatus and method described above, has the following characteristics. The packaging bag 16 is formed from an antislip flexible packaging material 35. The packaging material 35 comprises a heat sealable polyethylene flexible wall 45 having an outer surface 46, the wall 45 having an average surface weight of 92.2 g/m². The wall 45, including its outer surface 46, is of the second substance, a blend of 40% linear low density polyethylene, 20% medium density polyethylene and 40% low density polyethylene. The second substance has a density of 922 kg/m³ and a melt mass flow rate (ISO 1133-1, 190° C./2.16 kg) of 0.73 g/10 minutes. The bag 16 is a pillow bag 16 formed of a seamless tube extending from a bag bottom 57 to a bag mouth 58. The bag 16 has a cross welded bottom 57. The bag 16 has a bag height 59, from bottom 57 to mouth 58, of 900 mm. The bag 16 has a layflat bag width 60 of 490 mm. The bag 16 is large enough to accommodate 25 kilograms of individually-quick-frozen vegetables in it. The bag's 16 wall 45 has a roughened part 47 in the middle of the bag's 16 front side, in the form of a roughened strip, from the bag bottom 57 to the bag mouth 58, with a strip width 61 of 320 mm. Further, the bag's 16 wall 45 has a similar roughened part 47 in the middle of the bag's 16 back side. In the wall's roughened parts 47 the packaging material 35 comprises a multiplicity of separate antislip protrusions 7 of a first substance. The antislip protrusions 7 are formed of particles 36 fixed, namely fused, to the wall 45. The multiplicity of the antislip protrusions 7 look to the outside 18 of the packaging bag 16. The first substance is high density polyethylene of a density between 940 and 970 kg/m³, melting range (DSC): 128-130° C., vicat softening point (ISO 306): 126° C., melt mass flow rate (ISO 1133-1, 190° C./2.16 kg): 6 g/10 minutes. The antislip protrusions 7 are randomly distributed on the wall outer surface 46 and projecting from the outer surface 46 to a typical protrusion height 11 of between about 130 micrometres and 270 micrometres with an average of top-plan-view aspect ratios of the multiplicity of the antislip protrusions 7 being at most 1.5. The top-plan-view aspect ratio of an antislip protrusion 7 means a ratio of the antislip protrusion greatest extent 10 to antislip protrusion smallest extent 13 of the antislip protrusion 7 in a top plan view of the wall roughened part 47 taken from above the antislip protrusions 7 (see FIG. 7.). The antislip protrusions 7 are of random top-plan-view sizes 14 typically of between 160 and 300 micrometres. The antislip protrusions 7 have a typical volume of from about 0.0021447 mm$^3$ to about 0.0141372 mm$^3$ per antislip protrusion 7. There are about 60 antislip protrusions 7 per cm$^2$ within the roughened parts 47. The multiplicity of the antislip protrusions 7 occupy about 2.5% of the area of the antislip packaging material 35 in a top plan view of the wall roughened part 47 taken from above the antislip protrusions 7. As concerning a shape of the antislip protrusions 7, a vast majority of them typically have a hidden surface portion 12 being a portion of the free surface of the antislip protrusion 7 which the antislip protrusion 7 covers from a viewer in a top plan view of the wall 45 taken from above the antislip protrusions 7. A vast majority of the antislip protrusions 7 typically have at least one undercut 15 and include at least one area 8 immediately above the undercut 15, the antislip protrusion 7 being so dimensioned as to form a separation 42 between the at least one area 8 and the wall outer surface 46 which, in average, is at least about 50 to 100 micrometres.

Example 3: Apparatus and Method

Figure 8:
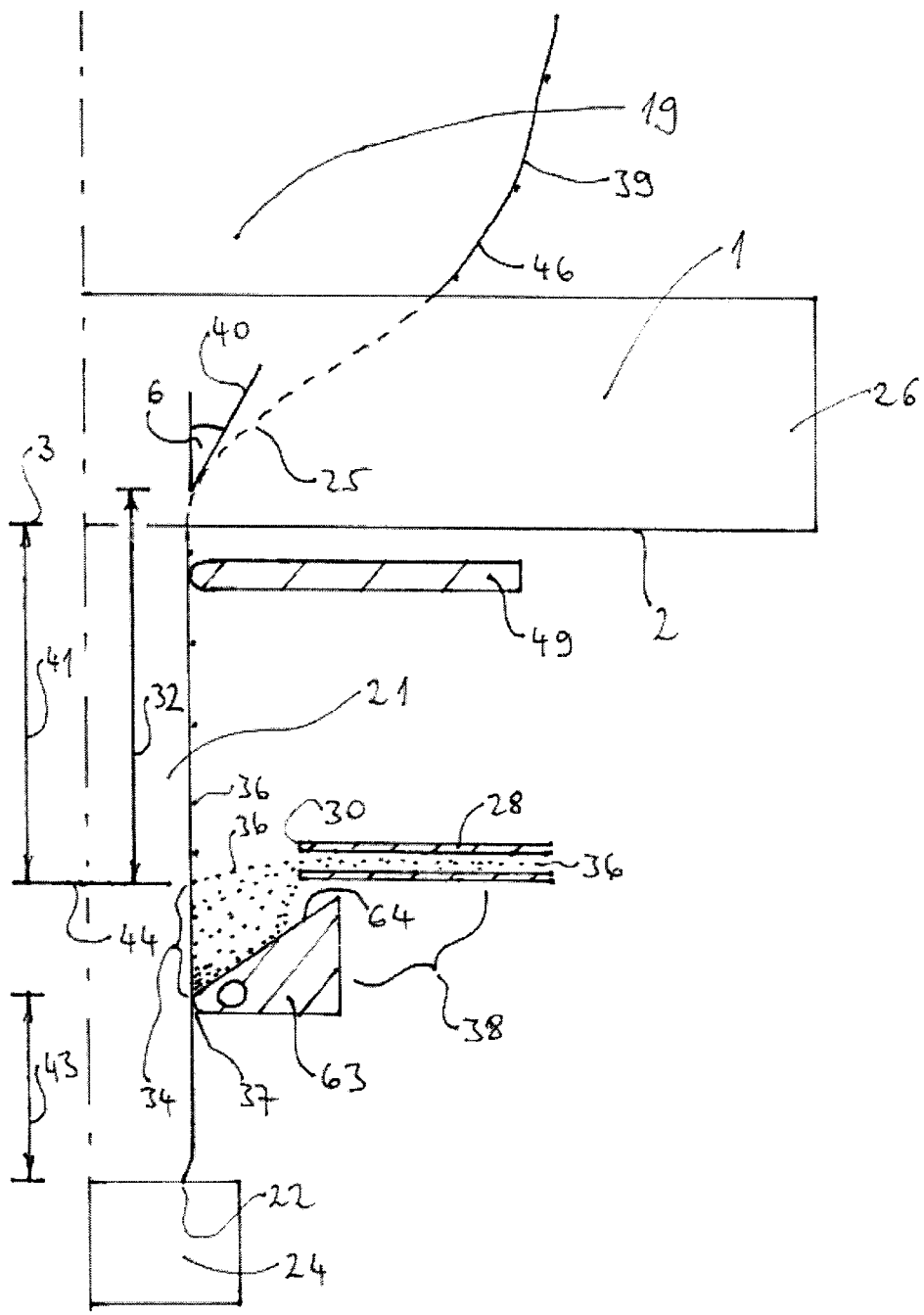
FIG. 8. is a schematic side view of an apparatus for roughening a blown film, with certain portions shown in vertical section (not in scale).

See the Figures, especially FIG. 8. (not in scale!). This example apparatus differs from the apparatus of Example 2 in that here the landing area 34 is not in an expanding area 25 but in a non-divergent, cylindrical part of the bubble 19. The second vertical distance 41, in a side view of the apparatus, between the (top of the) landing area 34 and the air ring bottom 2 is 0.3 times the die gap outer diameter 23. Further, the particle dispersing unit 38 includes a blowing feeder 28 and a contacting unit 63. The feeder 28 is suitable for carrying particles 36 to the path 19 of the wall outer surface 46 and for filling particles 36 onto a top surface 64 of the contacting unit 63. The contacting unit 63 has an internal fluid cooling and has an end proximate to the outer surface 46 which constitutes the particle dispersing unit proximate end 37 and is suitable to be in a constant contact with the outer surface 46 of the proceeding wall 45 and has a top surface 64 slanting toward the path 39, the top surface 64 suitable to deliver the particles 36, filled onto the top surface 64, to the wall outer surface 46.

In operation, the bubble 19 is adjusted to have a cylindrical shape and a tacky hot wall outer surface 46 adjacent the contacting unit 63. The feeder 28 is operated and thereby particles 36 are sprayed from the feeder 28 to the outer surface 46 and other particles 36 are filled onto the slanting top surface 64 of the contacting unit 63, which is used to conduct, like a chute, the particles 36 to the hot and tacky outer surface 46. These particles 36 gathering on the top surface 64 adjacently the tacky outer surface 46 are stuck to the outer surface 46 and made to proceed therewith further. From that moment on, they are exposed to the fusing process as explained above.

Example 4: Packaging Bag 16

Figure 5A:
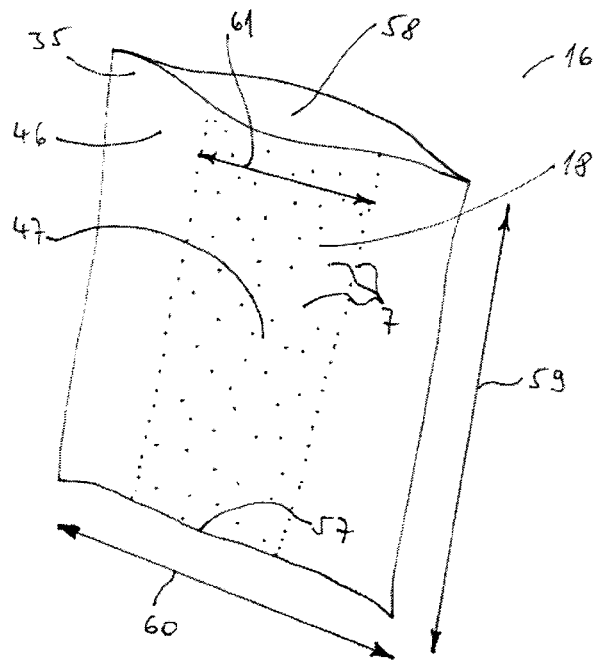
FIG. 5a. is a perspective view of a packaging bag.
Figure 5B:
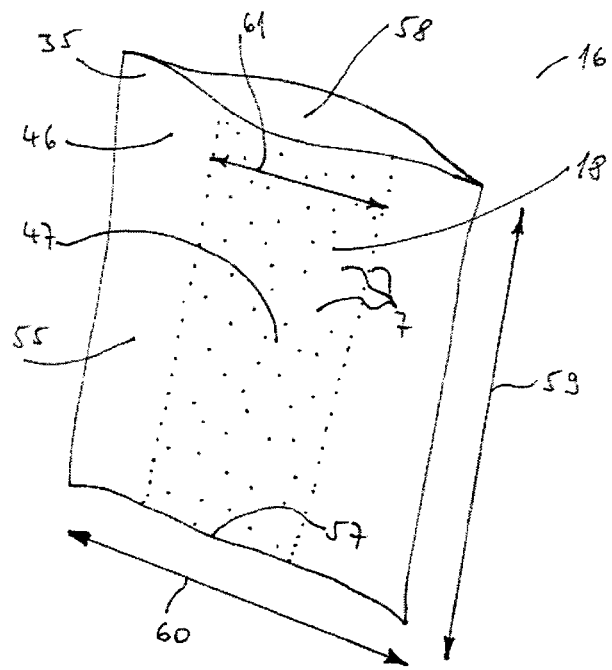
FIG. 5b. is a perspective view of a packaging bag.
Figure 6:
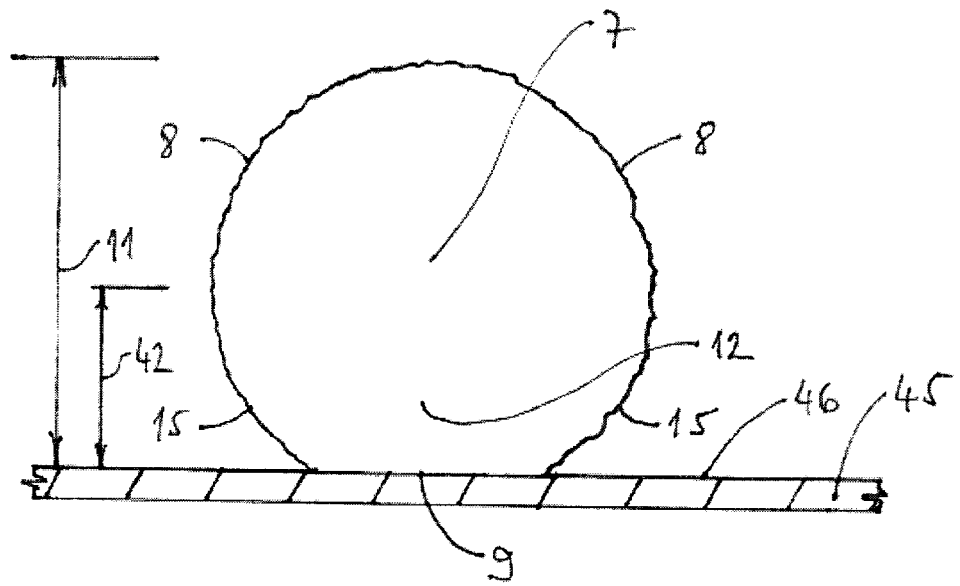
FIG. 6. is a side view of an antislip protrusion.
Figure 7:
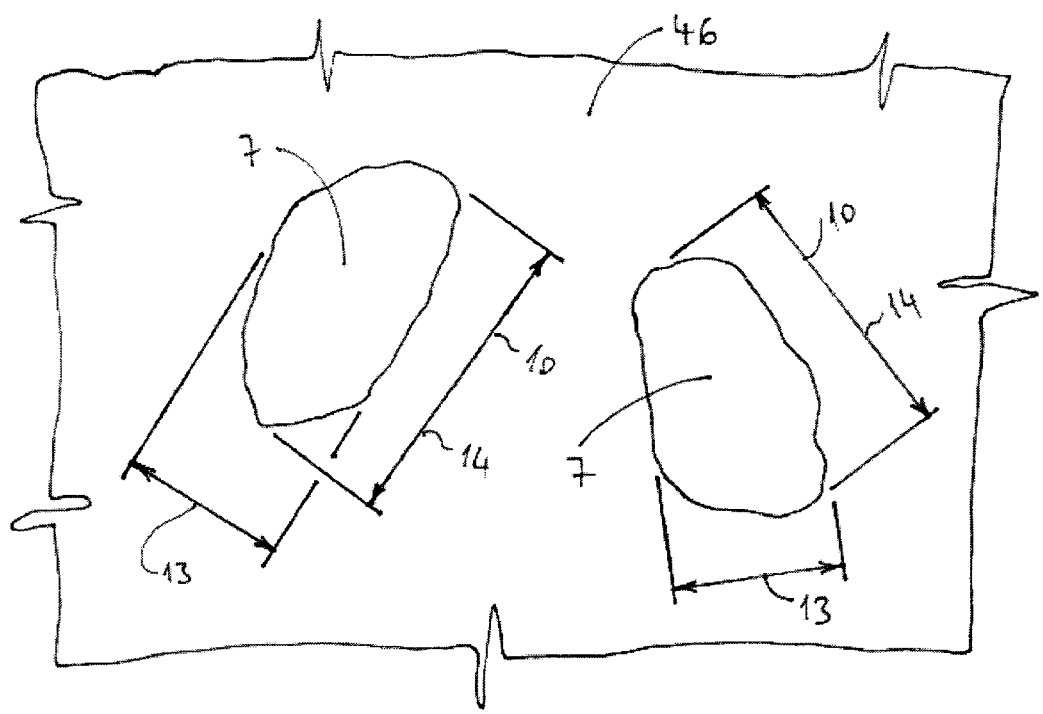
FIG. 7. is a top plan view of a roughened part.

See the Figures, especially FIG. 5b. An antislip, heat sealable plastic packaging bag 16 can be made with providing a polyolefin woven fabric 55 tube, e.g., of a fabric surface weight of 100 g/m$^2$, and laminating both main sides of the layflat tube with roughened film strips corresponding to the roughened part 47 of the wall 45 of the packaging material 35 of Example 2. The laminating could happen e.g., with a PUR reactive adhesive or extrusion lamination or with any other suitable means. The multiplicity of the antislip protrusions 7 look to the outside 18 of the packaging bag 16.

Example 5: Method for Producing a Packaging Bag 16

An antislip, heat sealable plastic packaging bag 16 can be made with providing particles 36 of a powder of high density polyethylene of a melt mass flow rate (ISO 1133-1, 190° C./2.16 kg) of 20 g/10 minutes in a size of 125 to 180 micrometres and with providing a polypropylene woven fabric 55 tube (either coated or non-coated type) and with fixing the particles 36 onto the outer surface 46 of the wall 45 of woven fabric 55 with an adhesive glue. Technical details of such a coating of a polyolefin wall outer surface 46 with such particles 36 we worked out in a test series in which we used a polyethylene film wall outer surface 46 instead of a polypropylene woven fabric 55 wall outer surface 46 but we think our results are also valid for this example case. We used a plastic wall outer surface 46 corona treated once, having a treatment of at least 42 dyn/cm (measured with a 42-dyn test ink). For roughening the outer surface 46, we used high density polyethylene powder screened to a size-fraction of 125 to 180 micrometres. We applied about 160 roughening particles 36 per cm$^2$. We adhered the particles 36 to the outer surface 46. Namely, we applied a lacquer to the outer surface 46 and sprayed the powder particles 36 into the tacky lacquer then crosslinked the lacquer with ultraviolet light irradiation. The particles 36 were blown through a corona discharge treating station while they were sprayed onto the outer surface 46 in order to provide a good bond between the particles 36 and the lacquer. We recorded the following manufacturing data. Lacquer type used: SunChemical IU 10050 screen-printing UV lacquer (Spanish make). Lacquer viscosity we measured to be 73 seconds at 20° C. with DIN cup 4 (much thicker than water). Lacquer quantity applied to the outer surface (cured): 9.57 g/m$^2$, corresponding to 8.7 micrometres lacquer thickness (without powder in it). The result was that in many antislip protrusions 7 the antislip protrusion has a hidden surface portion 12 covered by the antislip protrusion 7 from a viewer in a top plan view.

The invention claimed is:
1. An antislip, heat sealable plastic packaging bag,
the packaging bag comprising an antislip flexible packaging material,
the packaging material comprising a heat sealable plastic flexible wall having an outer surface, the wall having an average surface weight of at most 500 g/m$^2$,
in at least a part, a roughened part, of the wall the packaging material further comprising a multiplicity of separate antislip protrusions, of a first substance, randomly distributed on the outer surface and projecting from the outer surface to a protrusion height of between 50 micrometres and 10000 micrometres, with an average of top-plan-view aspect ratios of the multiplicity of the antislip protrusions being at least 1.0 and at most 5.0,
at least some of the antislip protrusions having a hidden surface portion being a portion of a free surface of the antislip protrusion which the antislip protrusion covers from a viewer in a top plan view of the wall taken from above the antislip protrusions,
the multiplicity of the antislip protrusions looking toward an outside of the packaging bag, the first substance being a thermoplastic polymer, and the outer surface being of a second substance different in some property from the first substance, and the first substance has a melt mass flow rate of at least 0.6 g/10 min. determined at 190° C. under a load of 2.16 kg in accordance with ISO 1133-1 and the packaging material includes plastic woven fabric.

2. The packaging bag according to claim 1, wherein the first substance has a melt mass flow rate of at least 0.7 g/10 min., at least 0.8 g/10 min., at least 0.9 g/10 min., or at least 1.0 g/10 min., determined at 190° C. under a load of 2.16 kg in accordance with ISO 1133-1.

3. The packaging bag according to claim 1, wherein the first substance has a melt mass flow rate of at most 300 g/10 min. determined at 190° C. under a load of 2.16 kg in accordance with ISO 1133-1.

4. The packaging bag according to claim 1, wherein the antislip protrusions occupy at most 60% of an area of the antislip packaging material in a top plan view of the wall roughened part taken from above the antislip protrusions.

5. The packaging bag according to claim 1, wherein the antislip protrusions are of random top-plan-view sizes.

6. The packaging bag according to claim 1, wherein at least some antislip protrusions each have a volume of from 0.0000335 mm$^3$ to 524 mm$^3$.

7. The packaging bag according to claim 1, wherein the antislip protrusions having the hidden surface portion have at least one undercut and include at least one area immediately above the undercut, the antislip protrusion being so dimensioned as to form a separation between the at least one area and the wall outer surface which is greater than 12 micrometres.

8. The packaging bag according to claim 1, wherein the packaging bag is large enough to accommodate at least 4.5 kilograms of contents in it.

9. The packaging bag according to claim 1, wherein the antislip protrusions are fixed to the wall.

10. The packaging bag according to claim 9, wherein the antislip protrusions are formed of particles fixed to the wall.

11. The packaging bag according to claim 10, wherein the antislip protrusions are formed of granules fused to the wall.

12. A method for providing an antislip, heat sealable plastic packaging bag, the method including:

providing particles of a first substance and of a suitable size and shape, the first substance being a thermoplastic polymer, providing a film blowing machine having an annular die gap and an external bubble-cooling unit above the die gap and a haul-off unit above the external bubble-cooling unit, providing a blown film bubble consisting of a plastic wall emerging from the die gap and proceeding toward the haul-off unit, the plastic wall having an outer surface of a second substance, the second substance different in some property from the first substance and suitable to fuse with the first substance, providing a neck of the bubble, in which the wall is suitably hot and plastic-state, between the die gap and a freezing line of the bubble, the freezing line being a part of the bubble where the wall is made to reach a final thickness of the wall, selecting an area, the landing area, of the neck between the die gap and the external bubble-cooling unit, where the outer surface is tacky, in the landing area bringing and sticking, with a random distribution, the particles to the outer surface of at least a part, the roughened part, of the wall, using a heat content of the suitably hot wall for starting a fusing process in the proceeding wall for fusing the stuck particles to the outer surface, ending the fusing process, by cooling, at a desired extent of the fusing for forming a suitably strong fixation between the outer surface and the particles fused to it, freezing the wall by cooling, for providing a heat sealable, plastic, flexible frozen wall, providing in the frozen wall an average surface weight of at most 500 g/m$^2$, thereby forming, from the particles fused to the wall, a multiplicity of separate antislip protrusions of the first substance randomly distributed on the outer surface of the frozen wall and projecting from the outer surface to a protrusion height of between 50 micrometres and 10000 micrometres with an average of top-plan-view aspect ratios of the multiplicity of the antislip protrusions being at least 1.0 and at most 5.0, providing at least some of the antislip protrusions with a hidden surface portion being a portion of a free surface of the antislip protrusion which the antislip protrusion covers from a viewer in a top plan view of the wall taken from above the antislip protrusions, the frozen wall together with the antislip protrusions projecting from its outer surface constituting an antislip flexible packaging material, forming from the antislip flexible packaging material a packaging bag with the multiplicity of the antislip protrusions looking toward an outside of the packaging bag, and selecting the first substance to have a melt mass flow rate of at least 0.6 g/10 min. determined at 190° C. under a load of 2.16 kg in accordance with ISO 1133-1.

13. The method according to claim 12, including selecting the first substance to have a melt mass flow rate of at least 0.7 g/10 min., at least 0.8 g/10 min., at least 0.9 g/10 min., or at least 1.0 g/10 min., determined at 190° C. under a load of 2.16 kg in accordance with ISO 1133-1.

14. The method according to claim 12, including selecting the first substance to have a melt mass flow rate of at most 300 g/10 min. determined at 190° C. under a load of 2.16 kg in accordance with ISO 1133-1.

15. The method according to claim 12, including forming the antislip protrusions occupying at most 60% of an area of the antislip packaging material in a top plan view of the wall roughened part taken from above the antislip protrusions.

16. The method according to claim 12, including forming the antislip protrusions of random top-plan-view sizes.

17. The method according to claim 12, including forming at least some antislip protrusions each having a volume of from 0.0000335 mm$^3$ to 524 mm$^3$.

18. The method according to claim 12, including the antislip protrusions having the hidden surface portion having at least one undercut and including at least one area immediately above the undercut, the antislip protrusion being so dimensioned as to form a separation between the at least one area and the wall outer surface which is greater than 12 micrometres.

19. The method according to claim 12, including forming the packaging bag large enough to accommodate at least 4.5 kilograms of contents in it.

20. The method according to claim 12, including providing an outer diameter of the die gap, providing an expanding area of the neck in which the proceeding wall, carrying the particles stuck thereto, is exposed to a horizontal expansion, the expanding area provided with a shape in which planes tangent to the outer surface close angles, the angles of expansion, of at least 2.5 degrees with the vertical, and providing a first vertical distance, in a side view of the bubble, between the landing area and the expanding area which first vertical distance is either zero or at most equals 2.0 times the die gap outer diameter.

21. The method according to claim 12, wherein each of at least some of the multiplicity of separate antislip protrusions is formed from a single particle.

22. An apparatus for roughening a blown film, the apparatus having a sub-unit for a film blowing machine, the film blowing machine for producing a blown film plastic wall for a packaging material, the apparatus including:

a film blowing die head with an annular die gap, and an external cooling air ring above the die head, the die gap having an outer diameter, and the air ring having a bottom, the die gap and the air ring together suitable to define a path of an outer surface of the plastic wall, the path having a shape of a bubble extending from the die gap up through the air ring, and at least above the air ring bottom the bubble having one or more expanding areas in which the wall is exposed to a horizontal expansion and planes tangent to the path close angles, the angles of expansion, of at least 2.5 degrees with the vertical, the sub-unit further including a particle dispersing unit defining a landing area of the path by being suitable for dispersing in the landing area, with a random distribution, thermoplastic polymer particles on the outer surface between the die gap and the air ring, and at least one of:
a.) a second vertical distance, in a side view of the apparatus, between the landing area and the air ring bottom being either zero or at most 2.0 times the die gap outer diameter, and
b.) at least one of the one or more expanding areas including at least a part of the landing area.

23. The apparatus according to claim 22, wherein an end, proximate to the outer surface, of the particle dispersing unit is suitable to be closer to the outer surface than 1.0 mm.

24. The apparatus according to claim 22, wherein the air ring is either a dual-lip type air ring or an air ring having more than two cooling-air-orifices.

25. The apparatus according to claim 22, wherein a third vertical distance, in a side view of the apparatus, between the landing area and the die gap is either zero or at most 70 mm.

26. The apparatus according to claim 23, wherein the particle dispersing unit proximate end is suitable to be cooled and to have a contact with the outer surface.

27. The apparatus according to claim 26, wherein the particle dispersing unit includes a feeder for conveying the particles toward the outer surface and the particle dispersing unit proximate end is constituted by an end, proximate to the outer surface, of the feeder.

28. The apparatus according to claim 22, wherein the apparatus further includes a wind shield between a level of the air ring bottom and a top level of at least a part of the landing area for an at least partial protecting of the at least a part of the landing area from a wind of the air ring.

29. The apparatus according to claim 28, wherein the wind shield is an active wind shield including a wind shield chamber having a top and a bottom and an opening proximate and toward the wall outer surface, for conducting the wind at least partly through the proximate opening and through the wind shield chamber for at least partly protecting the landing area under the wind shield chamber bottom from the wind.

* * * * *